US011630451B2

United States Patent
Hattori et al.

(10) Patent No.: US 11,630,451 B2
(45) Date of Patent: Apr. 18, 2023

(54) ANALYSIS DEVICE, ANALYSIS METHOD, AND NON-TRANSITORY COMPUTER READABLE STORAGE MEDIUM

(71) Applicant: OMRON Corporation, Kyoto (JP)

(72) Inventors: Reiko Hattori, Kyoto (JP); Yuya Ota, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 234 days.

(21) Appl. No.: 17/269,256

(22) PCT Filed: Feb. 18, 2020

(86) PCT No.: PCT/JP2020/006264
§ 371 (c)(1),
(2) Date: Feb. 18, 2021

(87) PCT Pub. No.: WO2020/184087
PCT Pub. Date: Sep. 17, 2020

(65) Prior Publication Data
US 2021/0165401 A1    Jun. 3, 2021

(30) Foreign Application Priority Data
Mar. 13, 2019   (JP) .............................. JP2019-045743

(51) Int. Cl.
*G06N 5/046*     (2023.01)
*G05B 23/02*     (2006.01)

(52) U.S. Cl.
CPC ....... *G05B 23/0281* (2013.01); *G05B 23/024* (2013.01); *G06N 5/046* (2013.01)

(58) Field of Classification Search
CPC ............ G05B 23/024; G05B 19/41885; G06N 5/046; G06N 5/022; G06V 10/28
See application file for complete search history.

(56) References Cited

U.S. PATENT DOCUMENTS

2019/0042344 A1*   2/2019   Zhao .................. G05B 23/0243

FOREIGN PATENT DOCUMENTS

| EP | 3410245 | 12/2018 |
|---|---|---|
| JP | 2008084039 | 4/2008 |

(Continued)

OTHER PUBLICATIONS

"Office Action of Japan Counterpart Application" with English translation thereof, dated Jul. 12, 2022, p. 1-p. 12.

(Continued)

*Primary Examiner* — Manuel A Rivera Vargas
(74) *Attorney, Agent, or Firm* — JCIPRNET

(57) ABSTRACT

An analysis device according to an aspect of the present disclosure: acquires a plurality of pieces of premise information and measurement data which relate to states of a plurality of mechanisms which configure a production line; identifies causal relationships among the plurality of mechanisms by statistically analyzing the plurality of pieces of measurement data under constraint conditions imposed by the premise information; outputs causal relationship information indicating the identified causal relationships; accepts a revision to the causal relationships indicated by the outputted causal relationship information; revises the premise information so as to impose the constraint conditions which comport with the revised causal relationships; and saves the revised premise information.

13 Claims, 16 Drawing Sheets

(56) References Cited

FOREIGN PATENT DOCUMENTS

| | | |
|---|---|---|
| JP | 2008217711 | 9/2008 |
| JP | 2018206362 | 12/2018 |
| JP | 2019028929 | 2/2019 |

OTHER PUBLICATIONS

"International Search Report (Form PCT/ISA/210) of PCT/JP2020/006264", dated Apr. 21, 2020, with English translation thereof, p. 1-p. 4.
"Written Opinion of the International Searching Authourity (Form/ISA/237) of PCT/JP2020/006264", dated Apr. 21, 2020, with English translation thereof, p. 1-p. 6.
"Search Report of Europe Counterpart Application", dated Nov. 9, 2022, pp. 1-10.

* cited by examiner

| | A | B | C | D | E | F |
|---|---|---|---|---|---|---|
| A | 0 | 0 | 0 | 0 | 0 | 0 |
| B | 0 | 0 | 0 | 1 | 0 | 0 |
| C | 0 | 0 | 0 | 0 | 0 | 0 |
| D | 0 | 0 | 0 | 0 | 0 | 1 |
| E | 0 | 0 | 0 | 0 | 0 | 1 |
| F | 0 | 0 | 0 | 0 | 0 | 0 |

ANALYSIS DEVICE, ANALYSIS METHOD, AND NON-TRANSITORY COMPUTER READABLE STORAGE MEDIUM

CROSS-REFERENCE TO RELATED APPLICATION

This application is a 371 application of the International PCT application serial no. PCT/JP2020/006264, filed on Feb. 18, 2020, which claims the priority benefits of Japan Patent Application No. 2019-045743, filed on Mar. 13, 2019. The entirety of each of the above-mentioned patent applications is hereby incorporated by reference herein and made a part of this specification.

BACKGROUND

Technical Field

The present disclosure relates to an analysis device, an analysis method, and an analysis program.

Background Art

A production line in a factory and the like is composed of a plurality of mechanisms (devices) such as a conveyer, a robot arm, and the like. When an abnormality occurs in any one of the mechanisms of the production line, manufacturing of products stops, and there is a likelihood of major damage being caused. For this reason, in a factory and the like, a maintenance staff member regularly patrols a production line and checks for the occurrence of abnormalities and the presence/absence of signs thereof.

When an occurrence of an abnormality or a sign thereof is detected within a production line, in order to identify an actual cause of the abnormality, it is important to acquire causal relationships between respective mechanisms within the production line. However, the number of mechanisms composing a production line is large, and operation conditions of each mechanism change every day, and thus it is difficult to accurately acquire causal relationships of all the mechanisms.

For this reason, conventionally, a skilled maintenance staff member is able to recognize causal relationships between a plurality of mechanisms composing a production line and identifies a cause of an abnormality that has occurred within the production line or a sign thereof. In order to enable an unskilled maintenance staff member to perform such a maintenance operation, it is desirable to develop technologies for visualizing causal relationships among a plurality of mechanisms composing a production line.

Thus, in Patent Literature 1, a causal structure determining device that determines a causal structure of observation variables that is a model representing a causal relationship between the observation variables has been proposed. More specifically, the causal structure determining device generates a plurality of candidates for causal structures, evaluates degrees of complexity of models of the generated causal structures and matching balances of the causal structures with data on the basis of the data acquired relating to each observation variable, and determines a causal structure having the best evaluation as a causal structure of the observation variables. According to the invention disclosed in Patent Literature 1, by using the determined causal structure, causal relationships among the plurality of mechanisms composing the production line can be visualized.

CITATION LIST

Patent Literature

[Patent Literature 1]
  Japanese Patent Laid-Open No. 2008-217711

SUMMARY

Technical Problem

By statistically analyzing a plurality of pieces of measurement data acquired in relation with a plurality of mechanisms composing a production line, conditional independency between pieces of measurement data corresponding to the mechanisms can be derived, and a causal relationship between the mechanisms can be identified on the basis of the derived conditional independency. When a causal relationship between mechanisms is identified (derived) through such a statistical analysis, there are cases in which constraint conditions are imposed for restricting a certain range of the causal relationship. According to such constraint conditions, a range in which presence/absence of a causal relationship is determined can be narrowed down, and thus a causal relationship between mechanisms can be identified more accurately.

However, the inventors and the like of the present disclosure have found that there are the following problems in such a method of identifying a causal relationship. In other words, the constraint conditions are acquired on the basis of the existing knowledge on each mechanism. In contrast to this, a causal relationship between the mechanisms can change from time to time due to various factors such as an occurrence of a breakdown event and the like. The checking of a causal relationship between mechanisms is frequently performed from the viewpoint of a situation, which has not been experienced before, such as an occurrence of a defect in a manufactured product and stopping of a device composing a production line has occurred. The relationship of the production line in a view in which such a situation that has not been experienced before has occurred may deviate from a relationship of the production line assumed on the basis of existing knowledge. In other words, since knowledge on a view in which the causal relationship is checked is not acquired as existing knowledge, the constraint conditions imposed in advance may not be appropriate for an actual situation of the production line at a time point at which the causal relationship is checked. For this reason, the inventors and the like of the present disclosure have found that there is a problem in that there is a possibility of a causal relationship, in which the actual situation of the production line has been reflected, being unable to be accurately derived in a conventional statistical analysis using constraint conditions imposed in advance.

It is desirable to provide a technology for more accurately deriving a causal relationship between mechanisms in which actual situations of a production line are reflected.

Solution to Problem

In order to solve the problems described above, the present disclosure employs the following configurations.

According to one aspect of the present disclosure, there is provided an analysis device including: a data acquiring part configured to acquire a plurality of pieces of measurement data relating to states of a plurality of mechanisms composing a production line; a premise acquiring part configured to acquire premise information for imposing constraint conditions defining whether or not a causal relationship has been formed between the mechanisms; an analysis part configured to identify a causal relationship between the plurality of mechanisms by statistically analyzing the plurality of pieces of acquired measurement data under the constraint conditions imposed by the premise information; an output part configured to output causal relationship information representing the identified causal relationship; a revision accepting part configured to accept a revision to the causal relationship represented by the output causal relationship information; a premise revising part configured to revise the premise information such that constraint conditions appropriate for the revised causal relationship are imposed; and a premise storing part configured to store the revised premise information.

In this configuration, measurement data relating to a state of each mechanism and premise information used for imposing constraint conditions are acquired. By statistically analyzing the acquired measurement data under the constraint conditions imposed by the premise information, a causal relationship between the mechanisms is identified, and causal relationship information representing the identified causal relationship is output. In a case in which a relationship of a production line assumed under the imposed constraint conditions deviates from a relationship of the production line at a time point at which the causal relationship is identified, there is a likelihood of the output causal relationship information being incorrect.

Thus, in the configuration, a revision to the causal relationship represented by the output causal relationship information can be accepted. Then, the premise information is revised such that constraint conditions appropriate for the revised causal relationship are imposed, and the revised premise information is stored. In accordance with this, premise information in which various states of a site are gradually reflected can be acquired, and thus, causal relationship information having a high degree of certainty can be generated in accordance with the constraint conditions imposed by the premise information thereof. Thus, according to the configuration, a causal relationship between mechanisms in which actual situations of the production line are reflected can be derived more accurately. As a result, a user can accurately perceive the state of the site more quickly.

The production line may be any production line that can produce a certain object, and a type thereof is not particularly limited. The type of each mechanism is not particularly limited and may be appropriately selected in accordance with an implemented form. For example, each mechanism may be a conveyer, a robot arm, a servo motor, a cylinder, a suction pad, a cutter device, a sealing device, or the like. In addition, for example, each mechanism may be a combined device of a printer, a molding machine, a mounter, a reflow oven, a substrate inspection device, and the like. Furthermore, for example, each mechanism may include a device that performs an internal process, for example, such as a device that detects certain information using various sensors, a device that acquires data from various sensors, a device that determines certain information from acquired data, a device that performs information processing of acquired data, and the like in addition to a device that accompanies a certain physical operation as described above. One mechanism may be composed of one or a plurality of devices or may be composed of a part of a device. One device may be composed of a plurality of mechanisms. In a case in which the same device executes a plurality of processes, it may be regarded as different mechanisms. For example, in a case in which the same device executes a first process and a second process, the device executing the first process may be regarded as a first mechanism, and the device executing the second process may be regarded as a second mechanism.

A causal relationship being present between one pair of mechanisms represents that a state of one mechanism relates to a state of the other mechanism and, in one example, it represents that the state of one mechanism and the state of the other mechanism have a dependency relationship. Whether or not a causal relationship is formed between mechanisms is defined by the constraint conditions restricting a range (a combination of mechanisms) in which a causal relationship is formed. The defining of a causal relationship being formed between mechanisms may be at least one of imposing a condition of a possibility of a causal relationship being present between mechanisms and imposing a condition of a causal relationship being formed between mechanisms. The defining of a causal relationship not being formed between mechanisms may be imposing a condition of a causal relationship not being present between the mechanisms. In addition, the constraint conditions may give a directivity for which a causal relationship is formed or may not give a directivity. In a case in which a directivity for which a causal relationship is formed is given, the constraint conditions may define that a causal relationship is formed only from one mechanism to another mechanism. In a case in which a directivity for which a causal relationship is formed is not given, the constraint conditions may define that there is a possibility of a causal relationship being formed from the other mechanism to one mechanism in a case in which there is also a possibility of a causal relationship being formed from one mechanism to the other mechanism.

In the analysis device according to the one aspect, the premise information may define presence/absence of a relationship between the mechanisms, and the analysis part may identify the constraint conditions on the basis of the presence/absence of a relationship between the mechanisms defined by the premise information. According to this configuration, a causal relationship between the mechanisms can be appropriately derived. In addition, a relationship between the mechanisms defined by the premise information may include a directivity with which having a causal relationship is formed or may not include a directivity.

In the analysis device according to the one aspect, the analysis part may identify the constraint conditions by performing switching between a first level defining that the causal relationship is formed only between the mechanisms defined to directly have a relationship by the premise information and a second level defining that a causal relationship is formed also between the mechanisms defined to indirectly have a relationship by the premise information. According to such a configuration, switching between the levels of the constraint conditions can be performed, and thus a causal relationship between the mechanisms in which actual situations of the production line are reflected can be derived more accurately.

In the analysis device according to the one aspect, the premise information may be given for each event. In addition, the acquisition of the premise information may include selection of an event for identifying the causal relationship and acquisition of the premise information according to the selected event. According to such a configuration, a causal relationship between the mechanisms in which actual situations of the production line are reflected can be derived more accurately in accordance with the event. In addition, the "event" may include all kinds of event that may occur in the production line such as an occurrence of a predetermined breakdown, an occurrence of a predetermined defect in a manufactured product, and the like.

In the analysis device according to the one aspect, the premise information may be given for each device configuration. In addition, the acquisition of the premise information may include selection of a device configuration for identifying the causal relationship and acquisition of the premise information according to the selected device configuration. According to such a configuration, a causal relationship between the mechanisms in which actual situations of the production line are reflected can be derived more accurately in accordance with the device configuration. In addition, the "device configuration" may represent a part of the production line or may represent the whole production line. A part of the production line may be composed of one or a plurality of devices such as a pressing machine, a packaging machine, and the like or may be composed of a part of a device. The type of device configuration may be defined by all the combinations of mechanisms composing the production line.

In the analysis device according to the one aspect, the statistical analysis of the plurality of pieces of measurement data may include calculation of feature quantities from each of the pieces of the acquired measurement data, calculation of a conditional independency between the feature quantities calculated, and determination of presence/absence of the causal relationship between the mechanisms on the basis of the calculated conditional independencies between the feature quantities. According to such a configuration, a causal relationship between the mechanisms can be appropriately derived. The "conditional independency", for example, may be a partial correlation coefficient, a correlation coefficient, a covariance, a conditional probability, an accuracy matrix, or the like.

In the analysis device according to the one aspect, the statistically analyzing of the plurality of pieces of measurement data may include calculation of a plurality of feature quantities from each of the plurality of pieces of the acquired measurement data, calculation of a conditional independency between each of the feature quantities calculated from one piece of measurement data among the plurality of pieces of measurement data and each of the feature quantities calculated from another piece of the measurement data, and determination of presence/absence of the causal relationship between the mechanisms on the basis of the calculated conditional independencies. According to such a configuration, a causal relationship between the mechanisms can be appropriately derived.

In the analysis device according to the one aspect, outputting of the causal relationship information may include outputting of the causal relationship information through switching between a first form in which the identified causal relationship is represented using the mechanisms as items and a second form in which the identified causal relationship is represented using the feature quantities as items. According to such a configuration, a form in which the causal relationship information is output can be switched between the first form and the second form, and thus, a causal relationship between the mechanisms can be output in association with feature quantities used for deriving the causal relationship. By using the information of the feature quantity that is associated, in a case in which the output causal relationship information is incorrect, the causal relationship represented by the causal relationship information can be accurately revised.

In the analysis device according to the one aspect, outputting of the causal relationship information may include acceptance of selection of a first feature quantity from among the plurality of feature quantities calculated from the one piece of measurement data, acceptance of selection of a second feature quantity from among the plurality of feature quantities calculated from the other piece of the measurement data, and outputting of the conditional independency calculated between the first feature quantity and the second feature quantity that are selected. According to such a configuration, a causal relationship between the mechanisms can be output in association with a conditional independency calculated between the selected feature quantities. By using the conditional independency information calculated between the selected feature quantities, in a case in which the output causal relationship information is incorrect, the causal relationship represented by the causal relationship information can be accurately revised.

In the analysis device according to the one aspect, outputting of the causal relationship information may include acceptance of selection of a first feature quantity from among the plurality of feature quantities calculated from the one piece of measurement data, acceptance of selection of a second feature quantity from among the plurality of feature quantities calculated from the other piece of the measurement data, and outputting of at least one of a histogram or time series data of each of the first feature quantity and the second feature quantity that are selected. According to such a configuration, a causal relationship between the mechanisms can be output in association with at least one of a histogram and time series data of each of the selected feature quantities. By using at least one of the histogram and the time series data of each of the feature quantities, in a case in which the output causal relationship information is incorrect, the causal relationship represented by the causal relationship information can be accurately revised.

In the analysis device according to the one aspect, outputting of the causal relationship information may include generation of a graph representing the identified causal relationship and outputting of the generated graph. According to such a configuration, the derived causal relationship between the mechanisms can be represented using a graphical expression that can be easily perceived. In this way, a user can accurately perceive the state of the site more quickly.

In the analysis device according to the one aspect, the revising of the premise information may include, in a case in which mechanisms defined not to form a causal relationship by the constraint conditions are revised to have a causal relationship, revising the premise information such that constraint conditions defining that a causal relationship is formed between the mechanisms are imposed, and, in a case in which mechanisms defined to form a causal relationship by the constraint conditions are revised to have no causal relationship, revising the premise information such that constraint conditions defining that a causal relationship is not formed between the mechanisms are imposed. According to such a configuration, the premise information for imposing the constraint conditions can be appropriately revised. In this way, a causal relationship between the mechanisms in which actual situations of the production line are reflected can be derived more accurately.

As other aspects of the analysis device according to each of the forms described above, one aspect of the present disclosure may be an information processing method or a program that realizes each of the configurations described above and may be a storage medium, which can be read by a computer or the like, in which such a program is stored. Here, the storage medium that can be read by a computer or the like is a medium that accumulates information of a program and the like through an electrical, magnetic, optical, mechanical, or chemical reaction.

For example, an analysis method according to one aspect of the present disclosure is an information processing method using a computer, the analysis method including: acquiring a plurality of pieces of measurement data relating to states of a plurality of mechanisms composing a production line; acquiring premise information for imposing constraint conditions defining whether or not a causal relationship is formed between the mechanisms; identifying a causal relationship between the plurality of mechanisms by statistically analyzing the plurality of pieces of acquired measurement data under the constraint conditions imposed by the premise information; outputting causal relationship information representing the identified causal relationship; accepting a revision to the causal relationship represented by the output causal relationship information; revising the premise information such that constraint conditions appropriate for the revised causal relationship are imposed; and storing the revised premise information.

In addition, for example, an analysis program according to one aspect of the present disclosure is a program causing to computer to execute: acquiring a plurality of pieces of measurement data relating to states of a plurality of mechanisms composing a production line; acquiring premise information for imposing constraint conditions defining whether or not a causal relationship is formed between the mechanisms; identifying a causal relationship between the plurality of mechanisms by statistically analyzing the plurality of pieces of acquired measurement data under the constraint conditions imposed by the premise information; outputting causal relationship information representing the identified causal relationship; accepting a revision to the causal relationship represented by the output causal relationship information; revising the premise information such that constraint conditions appropriate for the revised causal relationship are imposed; and storing the revised premise information.

Advantageous Effects of Invention

According to the present disclosure, a causal relationship between mechanisms in which an actual situation of a production line is reflected can be derived more accurately.

DESCRIPTION OF EMBODIMENTS

Hereinafter, an embodiment according to one aspect of the present disclosure (hereinafter, referred to as "this embodiment") will be described with reference to the drawings. However, this embodiment described below is merely an example of the present disclosure in every point. It is apparent that various alterations and modification can be made without departing from the scope of the present disclosure. In other words, a specific configuration according to the embodiment may be appropriately employed in performing the present disclosure. Although data appearing in this embodiment will be described using a natural language, more specifically, the data is designated using a quasi-language, commands, parameters, a machine language, and the like that can be recognized by a computer.

1. Application Example

Figure 1:
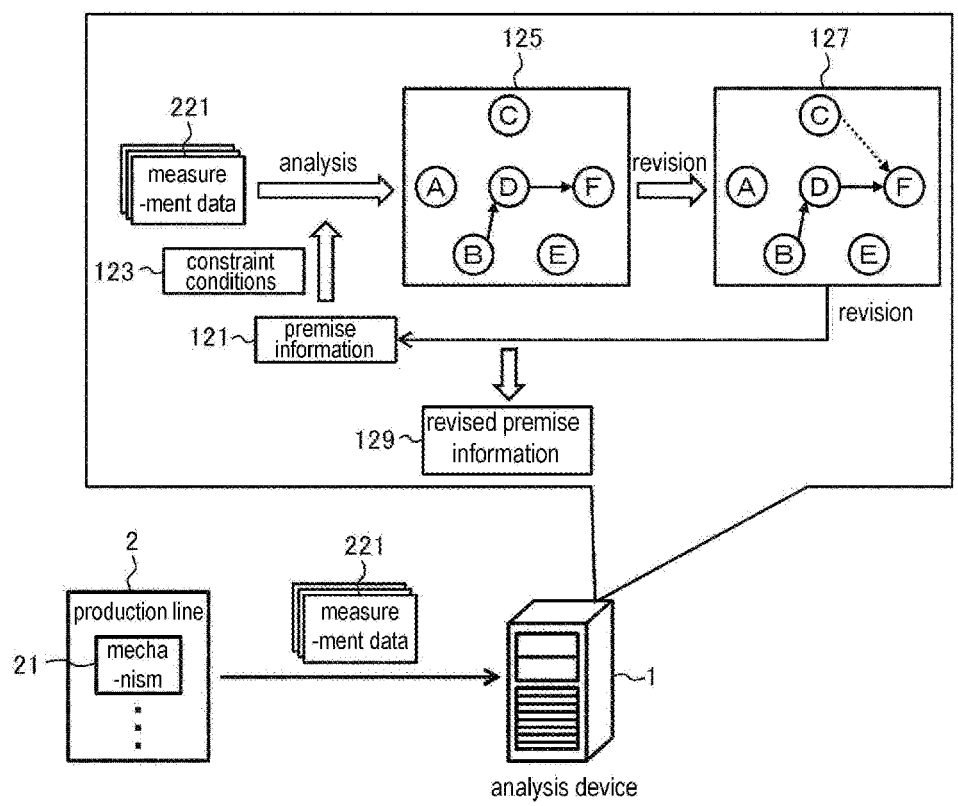
FIG. 1 schematically illustrates an example of a view in which the present disclosure is applied.

First, an example of a view to which the present disclosure is applied will be described with reference to FIG. 1. FIG. 1 schematically illustrates an example of a view in which an analysis device 1 according to this embodiment is applied. The analysis device 1 according to this embodiment is a computer that is configured to derive a causal relationship between a plurality of mechanisms 21 composing a production line 2.

More specifically, the analysis device 1 according to this embodiment acquires a plurality of pieces of measurement data 221 relating to states of the plurality of mechanisms 21 configuring the production line 2. In addition, the analysis device 1 according to this embodiment acquires premise information 121 used to impose constraint conditions 123 that define whether or not a causal relationship is formed between the mechanisms 21.

Subsequently, the analysis device 1 according to this embodiment identifies a causal relationship 125 between the plurality of mechanisms 21 by statistically analyzing a plurality of pieces of measurement data 221 that have been acquired under the constraint conditions 123 imposed using the premise information 121. A causal relationship being present between one pair of mechanisms 21 represents that a state of one mechanism 21 relates to a state of the other mechanism 21 and, in one example, it represents that the state of one mechanism 21 and the state of the other mechanism 21 have a dependency relationship.

The analysis device 1 according to this embodiment outputs causal relationship information that represents an identified causal relationship 125. In the example illustrated in FIG. 1, for the convenience of description, causal relationship information represents causal relationship 125 between six mechanisms 21 "A" to "F". This similarly also applies to the following description. Here, the number of mechanisms 21 is not limited to that of such an example and may be appropriately selected in accordance with an implemented form.

In a case in which a relationship of the production line 2 assumed in the imposed constraint conditions 123 deviates from the relationship of the production line 2 at a time point at which the causal relationship 125 is identified, there is a possibility that the causal relationship 125 represented by this causal relationship information is not correct. Thus, the analysis device 1 according to this embodiment accepts a revision of the causal relationship 125 represented by output causal relationship information. The analysis device 1 according to this embodiment revises the premise information 121 such that constraint conditions that are appropriate for the revised causal relationship 127 are imposed and stores the revised premise information 129.

As described above, in this embodiment, premise information in which various states of a site are gradually reflected can be acquired, and thus, causal relationship information having a high degree of certainty can be generated using the constraint conditions imposed by the premise information. Thus, according to this embodiment, a causal relationship between the mechanisms 21 in which actual situations of the production line 2 are reflected can be derived more accurately. As a result, a user can accurately perceive the state of the site more quickly.

The production line 2 may be configured to be able to produce any object, and a kind thereof is not particularly limited. The type of each mechanism 21 is not particularly limited and may be appropriately selected in accordance with an implemented form. For example, each mechanism 21 may be a conveyer, a robot arm, a servo motor, a cylinder (a molding machine or the like), a suction pad, a cutter device, a sealing device, or the like. In addition, for example, each mechanism 21 may be a combined device of a printer, a mounter, a reflow oven, a substrate inspection device, and the like. Furthermore, for example, each mechanism 21 may include a device that performs an internal process, for example, such as a device that detects certain information using various sensors, a device that acquires data from various sensors, a device that determines certain information from acquired data, a device that performs information processing of acquired data, and the like in addition to a device that accompanies a certain physical operation as described above. One mechanism 21 may be composed of one or a plurality of devices or may be composed of a part of a device. One device may be composed of a plurality of mechanisms 21. In a case in which the same device executes a plurality of processes, it may be regarded as different mechanisms 21. For example, in a case in which the same device executes a first process and a second process, the device executing the first process may be regarded as a first mechanism 21, and the device executing the second process may be regarded as a second mechanism 21.

2. Configuration Example

[Hardware Configuration]

Figure 2:
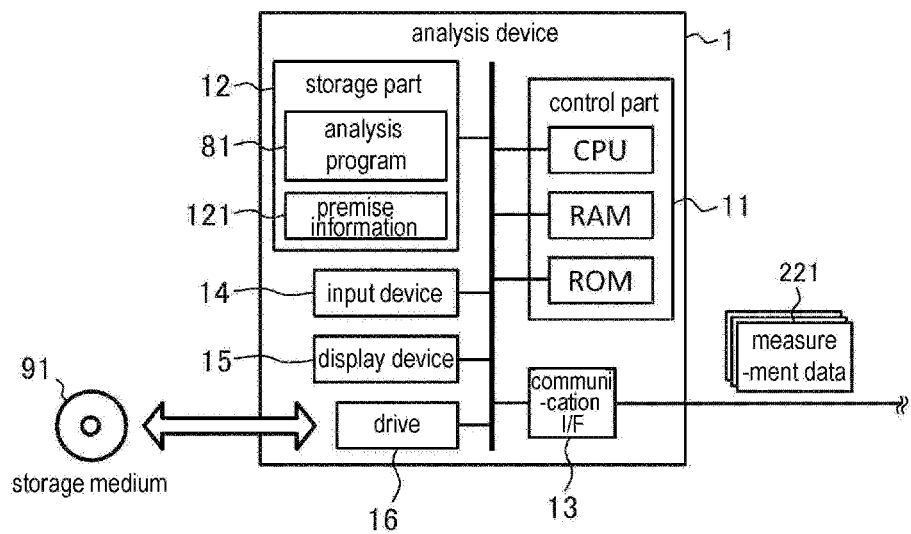
FIG. 2 schematically illustrates an example of the hardware configuration of an analysis device according to an embodiment.

Next, an example of the hardware configuration of the analysis device 1 according to this embodiment will be described with reference to FIG. 2. FIG. 2 schematically illustrates an example of the hardware configuration of the analysis device 1 according to this embodiment.

As illustrated in FIG. 2, the analysis device 1 according to this embodiment is a computer in which a control part 11, a storage part 12, a communication interface 13, an input device 14, a display device 15, and a drive 16 are electrically connected. In FIG. 2, the communication interface is described as a "communication I/F".

The control part 11 includes a central processing unit (CPU) that is a hardware processor, a random access memory (RAM), a read only memory (ROM), and the like and is configured to execute information processing based on a program and various kinds of data. The storage part 12 is an example of a memory and, for example, is composed of an auxiliary storage device such as a hard disk drive or a solid state drive. In this embodiment, the storage part 12 stores various kinds of information such as an analysis program 81, premise information 121, and the like.

The analysis program 81 is a program that is used for causing the analysis device 1 to execute information processing (FIGS. 4 and 5 to be described below) relating to deriving of a causal relationship between a plurality of mechanisms 21. The analysis program 81 includes a series of command groups of this information processing. The premise information 121 defines presence/absence of a relationship between mechanisms 21 and is used for imposing the constraint conditions 123. Details will be described below.

The communication interface 13, for example, is a wired local area network (LAN) module, a wireless LAN module, or the like and is an interface that is used for performing wired communication or wireless communication through a network. The analysis device 1 can acquire a plurality of pieces of measurement data 221, for example, by performing data communication with another information processing device such as a control device (not illustrated in the drawing) configured such that it controls the operation of the production line 2 through a network using this communication interface 13. A type of network, for example, may be appropriately selected from among the Internet, a radio communication network, a mobile communication network, a telephone network, a dedicated network, and the like. However, a path along which the measurement data 221 is acquired may not be limited to such an example.

The input device 14, for example, is a device such as a mouse, a keyboard, or the like that is used for performing an input. In addition, the display device 15 is an example of an output device and is, for example, a display. An operator can operate the analysis device 1 through the input device 14 and the display device 15. In addition, the display device 15 may be a touch panel display. In such a case, the input device 14 may be omitted.

The drive 16, for example, is a CD drive, a DVD drive, or the like and is a drive device that is used for reading a program stored in a storage medium 91. A type of drive 16 may be appropriately selected in accordance with the type of storage medium 91. At least any one of the analysis program 81, the premise information 121, and the plurality of pieces of measurement data 221 described above may be stored in this storage medium 91.

The storage medium 91 is a medium that accumulates information of a program and the like such that a computer, any other device, a machine, or the like can read the recorded information of a program and the like using an electrical, magnetic, optical, mechanical, or chemical reaction. The analysis device 1 may acquire any one of the analysis program 81, the premise information 121, and the plurality of pieces of measurement data 221 described above from this storage medium 91.

Here, in FIG. 2, as an example of the storage medium 91, a disc-type storage medium such as a CD, a DVD, or the like is illustrated. However, the type of storage medium 91 is not limited to the disc type but may be a type other than the disc type. As a storage medium of a type other than the disc type, for example, there is a semiconductor memory such as a flash memory or the like.

Regarding a specific hardware configuration of the analysis device 1, omission, substitutions, and additions of the constituent elements may be appropriately performed in accordance with the embodiment. For example, the control part 11 may include a plurality of hardware processors. A hardware processor may be configured as a microprocessor, a field-programmable gate array (FPGA), a digital signal processor (DSP), or the like. The storage part 12 may be composed of the RAM and the ROM that are included in the control part 11. At least any one of the communication interface 13, the input device 14, the display device 15, and the drive 16 may be omitted. The analysis device 1, for example, may further include an output device other than the display device 15 such as a speaker or the like. The analysis device 1 may be composed of a plurality of computers. In such a case, the hardware configurations of the computers may be the same or be different from each other. The analysis device 1 may be a general-purpose information processing device such as a desktop personal computer (PC) or a tablet PC, a general-purpose server apparatus, or the like in addition to an information processing device dedicatedly designed for provided services. In addition, the analysis device 1 may be configured to be able to control the operations of the production line 2. In such a case, the analysis device 1 may be a programmable logic controller (PLC). The analysis device 1 may include an input/output interface for a connection to the production line 2 and acquire the measurement data 221 through this input/output interface.

[Software Configuration]

Figure 3:
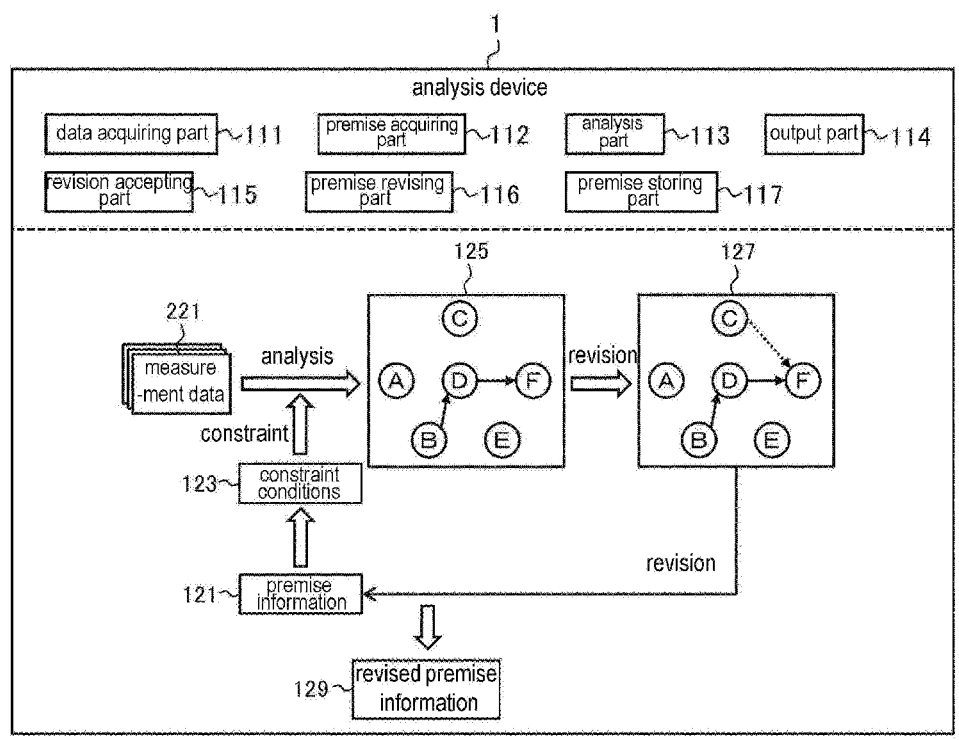
FIG. 3 schematically illustrates an example of the software configuration of the analysis device according to the embodiment.

Next, an example of the software configuration of the analysis device 1 according to this embodiment will be described with reference to FIG. 3. FIG. 3 schematically illustrates an example of the software configuration of the analysis device 1 according to the embodiment.

The control part 11 of the analysis device 1 expands the analysis program 81 stored in the storage part 12 into the RAM. The control part 11 analyzes and executes the analysis program 81 expanded into the RAM using the CPU, thereby controlling each constituent element. In accordance with this, as illustrated in FIG. 3, the analysis device 1 according to this embodiment operates as a computer that includes a data acquiring part 111, a premise acquiring part 112, an analysis part 113, an output part 114, a revision accepting part 115, a premise revising part 116, and a premise storing part 117 as software modules. In other words, in this embodiment, each software module of the analysis device 1 is realized by the control part 11 (CPU).

The data acquiring part 111 acquires a plurality of pieces of measurement data 221 relating to states of a plurality of mechanisms 21 composing the production line 2. The premise acquiring part 112 acquires premise information 121 that is used for imposing constraint conditions 123 defining whether or not a causal relationship is formed between mechanisms 21. The analysis part 113 statistically analyzes the plurality of pieces of measurement data 221 that have been acquired under the constraint conditions 123 imposed by the premise information 121, thereby identifying a causal relationship 125 between the plurality of mechanisms 21. The output part 114 outputs causal relationship information that represents the identified causal relationship 125.

The revision accepting part 115 accepts a revision for the causal relationship 125 represented by the output causal relationship information. In accordance with this revision instruction, a revised causal relationship 127 is acquired. The premise revising part 116 revises the premise information 121 such that constraint conditions appropriate for the revised causal relationship 127 are imposed. In accordance with this revision, the revised premise information 129 is acquired. The premise storing part 117 stores the revised premise information 129.

Each software module of the analysis device 1 will be described in detail in an operation example to be described below. In this embodiment, an example in which all the software modules of the analysis device 1 are realized by a general-purpose CPU is described. However, some or all of the software modules described above may be realized by one or a plurality of dedicated hardware processors. Regarding the software configuration of the analysis device 1, omission, substitutions, and additions of software modules may be appropriately performed in accordance with the embodiment.

3. Operation Example

Figure 4:
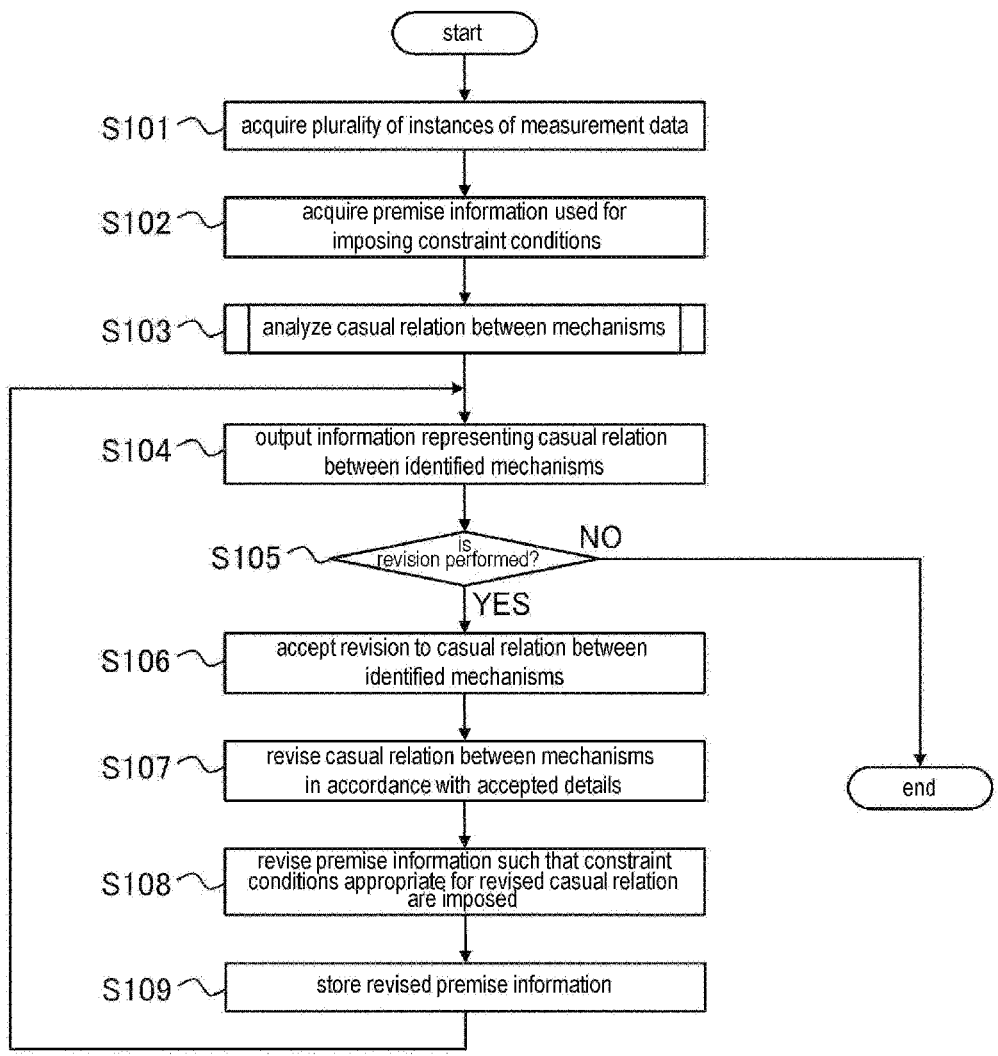
FIG. 4 illustrates an example of a processing sequence of the analysis device according to the embodiment.

Next, an operation example of the analysis device 1 will be described with reference to FIG. 4. FIG. 4 illustrates an example of a processing sequence of the analysis device 1 according to this embodiment. The processing sequence of the analysis device 1 to be described below is an example of an "analysis method" according to the present disclosure. However, the processing sequence described below is merely an example, and each process may be changed whenever possible. In addition, in the processing sequence described below, omission, substitutions, and additions of steps may be appropriately performed in accordance with an implemented form.

[Step S101]

In Step S101, the control part 11 operates as the data acquiring part 111 and acquires a plurality of pieces of measurement data 221 relating to states of the plurality of mechanisms 21 composing the production line 2.

In this embodiment, the control part 11 acquires a plurality of pieces of measurement data 221 from a control device (not illustrated in the drawing) configured such that it controls the operation of the production line 2 through a network using the communication interface 13. However, a path along which the measurement data 221 is acquired may not be limited to that of such an example. For example, the plurality of pieces of measurement data 221 may be stored in an external storage device such as a network-attached storage (NAS) or another information processing device. In such a case, the control part 11 may acquire the plurality of pieces of measurement data 221 from the external storage device or another information processing device through a network, the storage medium 91, or the like. For example, the analysis device 1 may be configured such that it directly controls the operation of the production line 2. In such a case, the control part 11 may directly acquire each piece of measurement data 221 from a sensor that observes the state of each mechanism 21 composing the production line 2.

Each piece of measurement data 221 may include data of all kinds relating to the state of each mechanism 21 composing the production line 2. For example, each piece of measurement data 221 may be data that represents at least one of a torque, a speed, an acceleration, a temperature, a current, a voltage, an air pressure, a pressure, a flow rate, a position, a size (a height, a length, or a width), and an area. Such measurement data 221 can be acquired by a known sensor or a measurement device such as a camera. For example, the flow rate can be acquired by a floating sensor. In addition, a position, a size, and an area can be acquired by an image sensor.

Each piece of measurement data 221 may be composed of data that is acquired from one or a plurality of measurement devices. In addition, each piece of measurement data 221 may be data that is acquired directly from a measurement device or may be data such as position data calculated on the basis of image data that is acquired by applying certain information processing on data acquired from a measurement device. Each piece of measurement data 221 is acquired in accordance with each mechanism 21. When the acquisition of a plurality of pieces of measurement data 221 is completed, the control part 11 causes the process to proceed to the next Step S102.

[Step S102]

In Step S102, the control part 11 operates as the premise acquiring part 112 and acquires premise information 121 that is used for imposing constraint conditions 123 defining whether or not a causal relationship is formed between mechanisms 21.

In this embodiment, the premise information 121 is stored in the storage part 12. For this reason, the control part 11 acquires the premise information 121 from the storage part 12. Here, a path along which the premise information 121 is acquired may not be limited to that of such an example. For example, the premise information 121 may be stored in an external storage device such as a NAS or another information processing device. In such a case, the control part 11 may acquire the premise information 121 from the external storage device or another information processing device through a network, the storage medium 91, or the like. When the premise information 121 is acquired, the control part 11 causes the process to process to a next Step S103. The processing sequence between Step S101 and Step S102 may be interchanged. In addition, Step S101 and Step S102 may be processed in parallel.

[Step S103]

In Step S103, the control part 11 operates as the analysis part 113 and statistically analyzes a plurality of pieces of measurement data 221 that have been acquired under the constraint conditions 123 imposed by the premise information 121, thereby identifying a causal relationship 125 between the plurality of mechanisms 21.

A method of statistically analyzing the plurality of pieces of measurement data 221 may not be particularly limited and may be appropriately selected in accordance with an implemented form. As the analysis method, for example, a graphical LASSO (GLASSO), a covariance selection method, Spirtes, Glymour, and Scheines (SGS), graphical modeling (GM), Peter & Clark (PC), a greedy equivalent search (GES), a fast causal inference (FCI), a linear non-Gaussian acyclic model (LiNGAM), a Bayesian network, or the like may be used. In this embodiment, the control part 11 statistically analyzes a plurality of pieces of measurement data 221 in accordance with the following processing sequence.

<Analysis of Causal Relationship>

Figure 5:
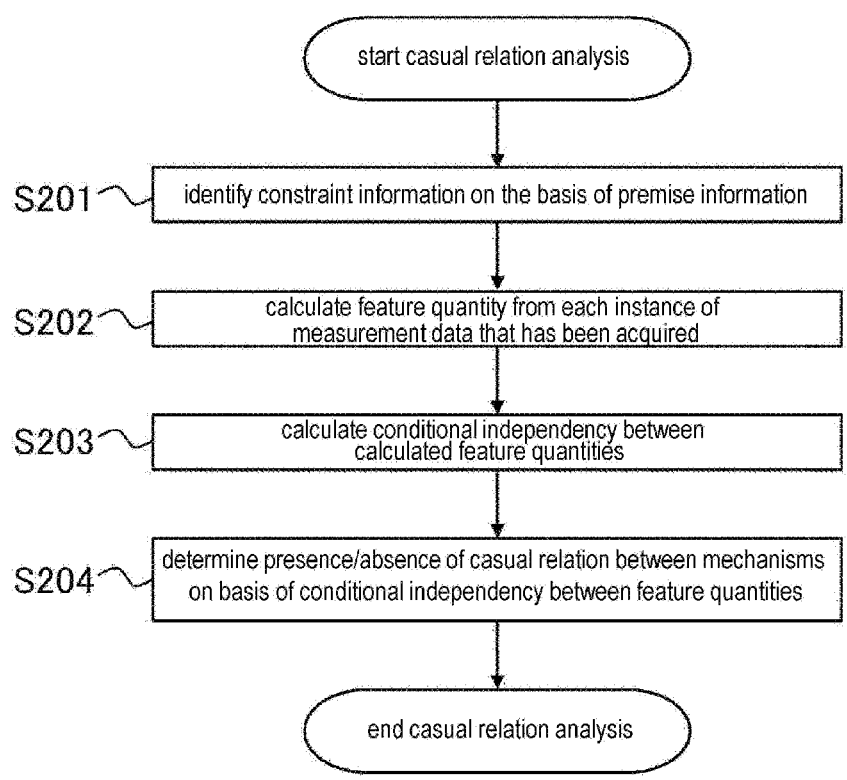
FIG. 5 illustrates an example of a processing sequence of deriving a causal relationship using the analysis device according to the embodiment.

An example of the process of Step S103 will be described in detail with further reference to FIG. 5. FIG. 5 illustrates an example of a processing sequence of a causal relationship analysis performed by the analysis device 1 according to this embodiment. The process of Step S103 according to this embodiment includes the following processes of Steps S201 to S204. Here, the processing sequence described below is merely an example, and each process may be changed whenever possible. In addition, in the processing sequence described below, omission, substitutions, and additions of steps may be appropriately performed in accordance with an implemented form.

(Step S201)

In Step S201, the control part 11 identifies constraint conditions 123 on the basis of the premise information 121. In this embodiment, the premise information 121 defines presence/absence of a relationship between mechanisms 21. The control part 11 identifies constraint conditions 123 on the basis of presence/absence of a relationship between mechanisms 21 that is defined by the premise information 121.

Figure 6A:
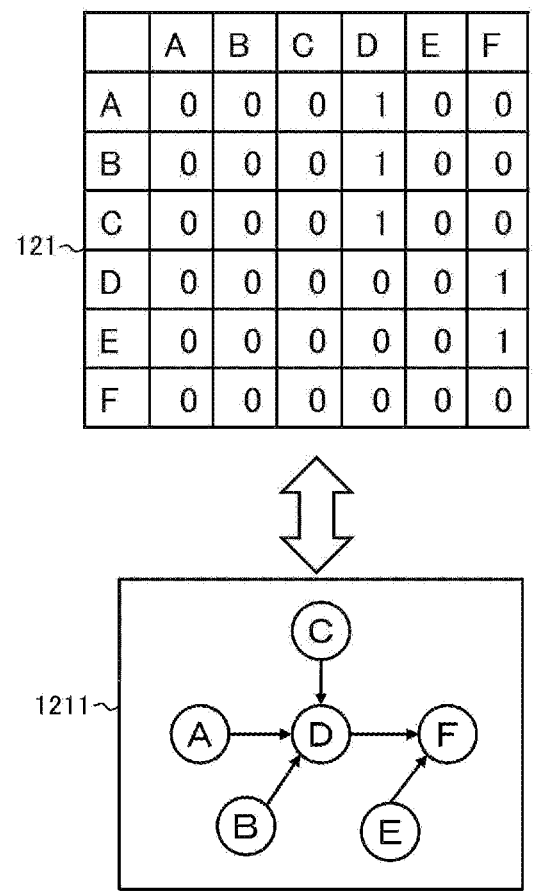
FIG. 6A illustrates an example of premise information according to the embodiment.

First, an example of the premise information 121 will be described with further reference to FIG. 6A. FIG. 6A schematically illustrates an example of the premise information 121 according to this embodiment. In the example illustrated in FIG. 6A, the premise information 121 is composed of an adjacency matrix that represents presence/absence of relationships between the mechanisms 21. In the adjacency matrix, an element (component) corresponding to a set of mechanisms 21 mutually having a relationship is "1", and an element (component) corresponding to a set of mechanisms 21 mutually having no relationship is "0". In this embodiment, a relationship includes a dependency relationship, in other words, a directivity of formation of a causal relationship. A column represents a dependency source, and a row represents a dependency destination. In a set of mechanisms 21 mutually having a relationship, elements corresponding to a direction in which a causal relationship is formed is "1". However, the data form of the premise information 121 is may not be limited to that of such an example and may be appropriately selected in accordance with an implemented form.

A graph 1211 is a directed graph that is derived from this adjacency matrix. In the graph 1211, each node represents each mechanism, and an edge represents presence of a relationship. In other words, being connected on the edge corresponds to having a relationship, and not being connected on the edge corresponds to having no relationship. In the example illustrated in FIG. 6A, a mechanism "A" has a relationship to a mechanism "D", a mechanism "B" has a relationship to a mechanism "D", a mechanism "C" has a relationship to a mechanism "D", a mechanism "D" has a relationship to a mechanism "F", and a mechanism "E" has a relationship to a mechanism "F", and the adjacency matrix and the graph 1211 represent such relationships. The relationship illustrated in FIG. 6A is merely an example for the convenience of description and are not for the purpose of limiting the present disclosure and this embodiment. In addition, the graph 1211 is merely an example for graphically representing the premise information 121, and the control part 11 does not need to generate the graph 1211 from the premise information 121. Whether the graph 1211 is generated or not may be appropriately selected in accordance with an implemented form.

Next, an example of a method of identifying the constraint conditions 123 from the premise information 121 will be described. In this embodiment, the control part 11 defines that a causal relationship is formed between mechanisms 21 defining that a relationship is present on the basis of the premise information 121, thereby identifying the constraint conditions 123. At this time, a range in which a causal relationship is formed is different in accordance with whether a causal relationship is defined to be formed only between mechanisms 21 that directly have a relationship or a causal relationship is defined to be formed also between mechanisms 21 that indirectly have a relationship. In this embodiment, the level of the constraint conditions 123 is divided in accordance with a difference in this range.

Figure 6B:
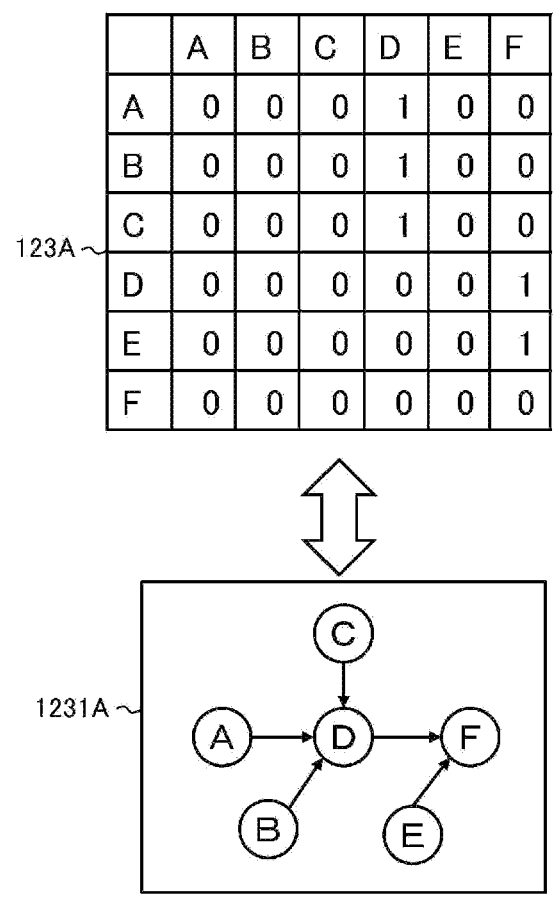
FIG. 6B illustrates an example of constraint conditions (a first level) according to the embodiment.

FIG. 6B illustrates an example of constraint conditions 123A of a first level identified on the basis of the premise information 121 illustrated in FIG. 6A. In the first level, the control part 11 defines that a causal relationship is formed only between mechanisms 21 defined to directly have a relationship by the premise information 121. For this reason, a range defined to have a causal relationship by the identified constraint conditions 123A is the same as the range defined to have a relationship by the premise information 121.

In the example illustrated in FIG. 6B, similar to the premise information 121, the constraint conditions 123A are represented by an adjacency matrix. A graph 1231A is a directed graph that is derived from the adjacency matrix representing these constraint conditions 123A. In the graph 1211 of the premise information 121, directly having a relationship corresponds to being directly connected using an edge. For this reason, in the first level, the graph 1231A is the same as the graph 1211 of the premise information 121.

Figures 6C, 7:
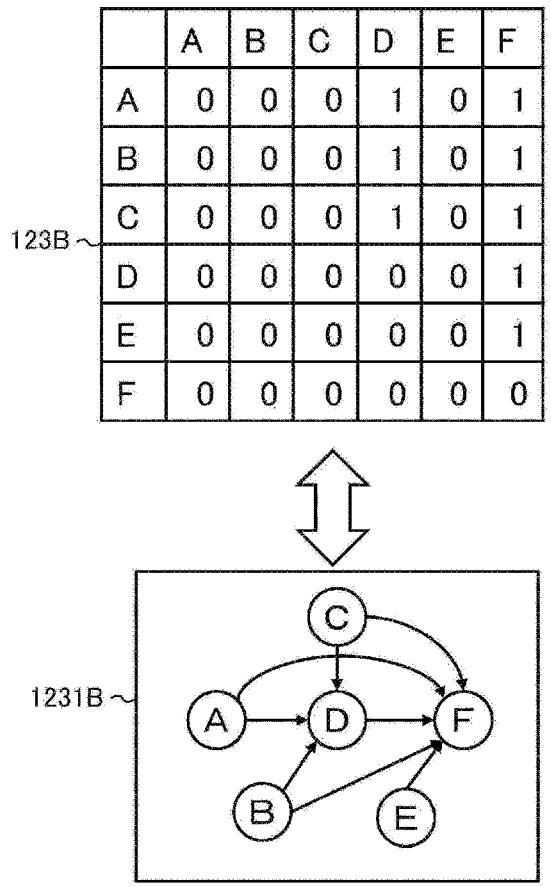
FIG. 6C illustrates an example of constraint conditions (a second level) according to the embodiment.
FIG. 7 illustrates an example of causal relationship information according to the embodiment.

On the other hand, FIG. 6C illustrates an example of constraint conditions 123B of a second level identified on the basis of the premise information 121 illustrated in FIG. 6A. In the second level, the control part 11 defines that a causal relationship is formed also between mechanisms 21 defined to indirectly have a relationship in addition to between mechanisms 21 defined to directly have a relationship by the premise information 121. For this reason, a range in which a causal relationship is defined to be formed by the identified constraint conditions 123B is wider than a range in which a relationship is defined to be formed by the premise information 121.

In an example illustrated in FIG. 6C, similar to the premise information 121, the constraint conditions 123B are represented by an adjacency matrix. A graph 1231B is a directed graph that is derived from the adjacency matrix representing these constraint conditions 123B. In the graph 1211 of the premise information 121, indirectly having a relationship corresponds to being indirectly connected using an edge through one or more nodes. For this reason, in the second level, the graph 1231B is different from the graph 1211 of the premise information 121. For example, premise information 121 is defined such that a mechanism "A" has a relationship to a mechanism "D", and a mechanism "D" has a relationship to a mechanism "F". In accordance with this, the constraint conditions 123B define that a causal relationship is formed between the mechanism "A" and the mechanism "F".

Here, in the example illustrated in FIG. 6C, the constraint conditions 123B define that a causal relationship is formed in a range in which a relationship is indirectly formed through one mechanism 21. In other words, on the graph 1231B, the constraint conditions 123B define that a causal relationship is formed in the range from a parent node to a grandchild node. However, a range in which a causal relationship is defined to be formed in accordance with the second level is not limited to that of such an example. The constraint conditions 123B may define that a causal relationship is formed in a range in which a relationship is indirectly formed with two or more mechanisms 21 interposed therebetween. In addition, the second level may be divided into a plurality of levels in accordance with the number of interposed mechanisms 21 which is interposed as a range in which a causal relationship is defined to be formed.

In the example illustrated in FIGS. 6B and 6C, similar to the premise information 121, the information of the constraint conditions (123A or 123B) is composed using the adjacency matrix. In this way, the information of the constraint conditions 123 may be composed using an adjacency matrix. However, the data form of the constraint conditions 123 may not be limited to that of such an example and may be appropriately selected in accordance with an implemented form. In addition, each of the graphs (1231A and 1231B) is merely an example for a graphical representation of corresponding respective constraint conditions (123A and 123B), and the control part 11 does not need to generate each of the graphs (1231A and 1231B) from the corresponding constraint conditions (123A and 123B). Whether or not a graph representing the constraint conditions 123 is generated may be appropriately selected in accordance with an implemented form.

In this embodiment, the control part 11 identifies the constraint conditions 123 through switching between the first level and the second level. For example, the control part 11 accepts designation of a level. Then, the control part 11 identifies constraint conditions 123 in accordance with the designated level. When the constraint conditions 123 are identified, the control part 11 causes the process to proceed to a next Step S202. The processing timing of Step S201 is not limited to that of such an example and may be appropriately changed in accordance with an implemented form.

(Step S202)

In Step S202, the control part 11 calculates one or a plurality of feature quantities on the basis of the acquired measurement data 221 of each piece. In this embodiment, the control part 11 calculates a plurality of feature quantities on the basis of the measurement data 221 of each piece. A type of feature quantities is not particularly limited and may be appropriately selected in accordance with an implemented form. In a case in which the measurement data 221 is continuous value data, for example, feature quantities calculated may be an amplitude within a frame, a maximum value, a minimum value, a mean value, a variance value, a standard deviation, an instant value (one point sampling), or the like. In addition, in a case in which the measurement data 221 is discrete value data, for example, feature quantities calculated may be an "on" time, an "off" time, a duty ratio, the number of times of "on", the number of times of "of" within each frame. In addition, the number of feature quantities to be calculated may not be particularly limited and may be appropriately selected in accordance with an implemented form. The Lingam numbers of feature quantities calculated from the measurement data 221 of pieces may be the same or be different from each other. When a plurality of feature quantities is calculated on the basis of the measurement data 221 of each piece, the control part 11 causes the process to proceed to a next Step S203.

(Step S203)

In Step S203, the control part 11 calculates a conditional independency between the feature quantities calculated. In this embodiment, the control part 11 calculates a conditional independency between each feature quantity calculated from one piece of measurement data and each feature quantity calculated from another piece of measurement data among a plurality of pieces of measurement data 221. The type of conditional independency is not particularly limited and may be appropriately selected in accordance with an implemented form. The calculated conditional independency, for example, may be a partial correlation coefficient, a correlation coefficient, a covariance, a conditional probability, an accuracy matrix, or the like. In this Step S203, the control part 11 may calculate one type of conditional independency or calculate a plurality of types of conditional independency. When a conditional independency between feature quantities is calculated, the control part 11 causes the process to proceed to a next Step S204.

(Step S204)

In Step S204, the control part 11 determines presence/absence of a causal relationship between the mechanisms 21 on the basis of each calculated conditional independency under the identified constraint conditions 123.

By defining whether or not a causal relationship is formed between mechanisms 21, the constraint conditions 123 restrict a range in which a causal relationship is formed. The defining of a causal relationship being formed between mechanisms 21 may be at least one of imposing a condition of a possibility of a causal relationship being present between mechanisms 21 and imposing a condition of a causal relationship being present between mechanisms 21. In addition, the defining of a causal relationship not being formed between mechanisms 21 may be imposing a condition of a causal relationship not being present between the mechanisms 21.

In a case in which a condition of a causal relationship not being present is imposed by the constraint conditions 123, the control part 11 determines that a causal relationship is not present between the corresponding mechanisms 21. In addition, in a case in which a condition of a causal relationship being present is imposed by the constraint conditions 123, the control part 11 determines that a causal relationship is present between the corresponding mechanisms 21. In other words, in a range in which a condition of a causal relationship being present/absent is imposed by the constraint conditions 123, the control part 11 uses the constraint conditions 123 as information that represents a causal relationship between mechanisms 21.

On the other hand, in a case in which a condition of a possibility of a causal relationship being present is imposed by the constraint conditions 123, the control part 11 determines presence/absence of a causal relationship between the corresponding mechanisms 21 on the basis of the calculated conditional independency. As one example, the control part 11 determines presence/absence of a causal relationship by comparing the calculated conditional independency with a threshold. In a case in which the value of the conditional independency is in proportion to a degree of a causal relationship being present, the control part 11 determines whether or not the value of the calculated conditional independency is equal to or larger than a threshold. Then, when the value of the calculated conditional independency is equal to or larger than the threshold, the control part 11 determines that a causal relationship is present between the corresponding mechanisms 21. Otherwise, the control part 11 determines that a causal relationship is absent between the corresponding mechanisms 21. The threshold may be appropriately set.

The method of determining presence/absence of a causal relationship on the basis of a conditional independency may not be appropriately limited to that of such an example and may be determined in accordance with a type of the conditional independency and the like. For example, a correspondence relationship between the degree of a causal relationship being present and the conditional independency may be opposite. In such a case, in a case in which the value of the conditional independency is equal to or smaller than the threshold, the control part 11 may determine that a causal relationship is present between the corresponding mechanisms 21. Otherwise, the control part 11 may determine that a causal relationship is absent between the corresponding mechanisms 21. In addition, the control part 11 determines presence/absence of a causal relationship between mechanisms 21 on the basis of a plurality of types of conditional independency.

As a result of such a determination, the control part 11 can identify a causal relationship 125 between mechanisms 21. When the causal relationship 125 between the mechanisms 21 is identified, the control part 11 ends the process relating to the analysis of a causal relationship. In accordance with this, when the series of processes of Step S103 is completed, the control part 11 causes the process to proceed to a next Step S104.

[Step S104]

Referring back to FIG. 4, in Step S104, the control part 11 operates as the output part 114 and outputs causal relationship information that represents the identified causal relationship 125.

Each of an output destination and an expression form of the causal relationship may not be particularly limited and may be appropriately selected in accordance with an implemented form. In this embodiment, as an output destination of the causal relationship information, the display device 15 is used. The control part 11 causes the display device 15 to display the causal relationship information as an output process. In addition, in this embodiment, as an expression form of the causal relationship information, a graph to be described below is used. In other words, in this embodiment, the output process of Step S104 includes generation of a graph representing the identified causal relationship 125 and output of the generated graph as the causal relationship information.

Furthermore, in this embodiment, the output process includes switching of a display form of the causal relationship information between two forms. In other words, in this embodiment, the control part 11 outputs causal relationship information by performing switching between a first form in which the identified causal relationship 125 is represented using each mechanism 21 as an item and a second form in which the identified causal relationship 125 is represented using each feature quantity as an item.

In addition, in this embodiment, the output process includes outputting of at least one of the calculated conditional independency, a histogram of feature quantities, and time series data of the feature quantities as additional information used for checking correctness of the identified causal relationship 125. In other words, in this embodiment, the control part 11 accepts selection of a first feature quantity from a plurality of feature quantities calculated from one piece of measurement data 221 from among a plurality of pieces of measurement data 221. The control part 11 accepts selection of a second feature quantity from among a plurality of feature quantities calculated from other measurement data. Then, the control part 11 outputs the conditional independency calculated between the first feature quantity and the second feature quantity that have been selected. In addition, the control part 11 outputs at least one of the histogram and the time series data of each of the first feature quantity and the second feature quantity that have been selected. Hereinafter, an example of the output process according to this embodiment will be described in detail.

(1) Display Form

Figure 8A:
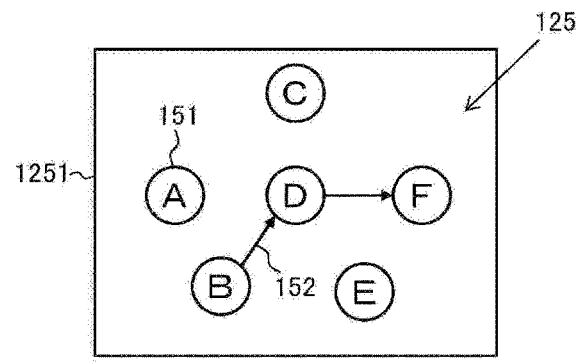
FIG. 8A illustrates an example of a display form of a causal relationship according to the embodiment.
Figure 8B:
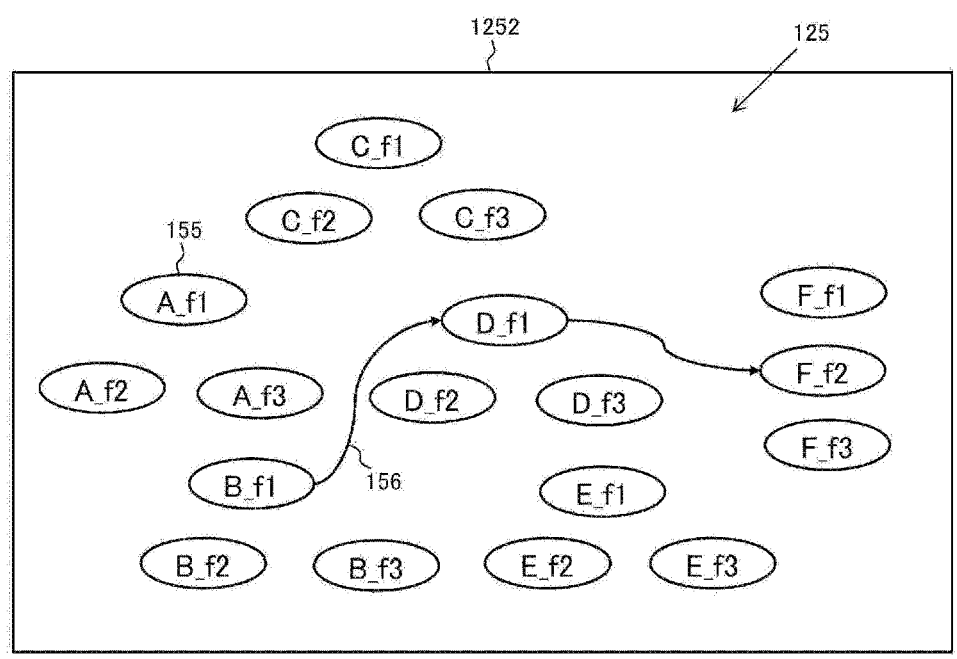
FIG. 8B illustrates an example of a display form of a causal relationship according to the embodiment.

First, an example of the display form of the causal relationship information will be described with further reference to FIGS. 7, 8A, and 8B. FIG. 7 illustrates an example of the adjacency matrix 1250 that represents the identified causal relationship 125. FIG. 8A illustrates an example of display using the first form representing the causal relationship 125 illustrated in FIG. 7 using each mechanism 21 as an item. FIG. 8B illustrates an example of display using the second form representing the causal relationship 125 illustrated in FIG. 7 using each feature quantity corresponding to each mechanism 21 as an item.

As illustrated in FIG. 7, similar to the premise information 121 and the like, the causal relationship information according to this embodiment includes an adjacency matrix 1250. The adjacency matrix 1250 can be acquired as a result of the process of Step S204 described above. In the adjacency matrix 1250, an element corresponding to a set of mechanisms 21 mutually having a causal relationship is "1", and an element mutually having no causal relationship is "0". In this embodiment, a causal relationship includes a dependency relationship.

A column represents a dependency source, and a row represents a dependency destination. The adjacency matrix 1250 illustrated in FIG. 7 represents that a mechanism "B" has a causal relationship to a mechanism "D", and a mechanism "D" has a causal relationship to a mechanism "F". The causal relationship illustrated in FIG. 7 is merely an example for the convenience of description and is not for the purpose of limiting the present disclosure and this embodiment.

As illustrated in FIG. 8A, in the first form, the control part 11 generates a first graph 1251 that includes a plurality of first nodes 151 representing the mechanisms 21 and edges 152 representing presence of a causal relationship on the basis of the adjacency matrix 1250. The first graph 1251 is an example of causal relationship information of the first form. In this embodiment, the first graph 1251 is a directed graph. An origin of an arrow of the edge 152 represents a dependency source, and a destination of the arrow of the edge 152 represents a dependency destination. The control part 11 causes the display device 15 to display the generated first graph 1251 as causal relationship information.

In the example illustrated in FIG. 8A, names (A to F) of corresponding mechanisms 21 are attached to the first nodes 151. However, using each mechanism 21 as an item may not be limited to such an example. Each piece of measurement data 221 is acquired for each mechanism 21. For this reason, using each mechanism 21 as an item may include using each piece of measurement data 221 as an item. For example, a name and the like of measurement for a corresponding mechanism 21 may be attached to each first node 151.

On the other hand, as illustrated in FIG. 8B, in the second form, the control part 11 generates a second graph 1252 that includes a plurality of second nodes 155 representing feature quantities corresponding to the mechanisms 21 and edges 156 representing presence of a causal relationship on the basis of the adjacency matrix 1250 and a result of the process of Step S204 described above. The second graph 1252 is an example of causal relationship information of the second form. In this embodiment, similar to the first graph 1251, the second graph 1252 is a directed graph as well. The control part 11 causes the display device 15 to display the generated second graph 1252 as causal relationship information.

The example illustrated in FIG. 8B assumes a view in which three feature quantities are calculated from each piece of measurement data 221 corresponding to each mechanism 21 in Step S202 described above. For example, "A_f1", "A_f2", and "A_f3" correspond to feature quantities calculated from the measurement data 221 for the mechanism "A". This similarly applies to the others.

The edges 156 are disposed to connect the second nodes 155 corresponding to the feature quantities used for determining presence of a causal relationship between corresponding mechanisms 21. In other words, in the example illustrated in FIG. 8, a view in which a causal relationship is identified to be present between a mechanism "B" and a mechanism "D" on the basis of the conditional independency calculated between a feature quantity "B_f1" and a feature quantity "D_f1", and a causal relationship is identified to be present between a mechanism "D" and a mechanism "F" on the basis of the conditional independency calculated between a feature quantity "D_f1" and a feature quantity "F_f2" is assumed.

The causal relationship information according to this embodiment includes the graphs (1251 and 1252) of the forms. Each of the nodes (151 and 155) is one example of an "item" according to the present disclosure. In Step S104, the control part 11 causes the display device 15 to display the graphs (1251 and 1252) of the forms through switching. In accordance with this, the causal relationship 125 between the mechanisms 21 can be output in association with feature quantities used for identifying the causal relationship 125. For this reason, a user can determine whether or not the identified causal relationship 125 is correct on the basis of the graphs (1251 and 1252) of the forms.

(2) Output of Additional Information

Next, an example of a form in which additional information is output will be described with further reference to FIGS. 9A to 9C and 10. FIGS. 9A to 9C and 10 schematically illustrate an example of screens 1253 to 1256 displayed in the display device 15. On the screens 1253 to 1255 illustrated in FIGS. 9A to 9C, information 1261 to 1263 relating to the conditional independency calculated between the first feature quantity and the second feature quantity is displayed. On the screen 1256 illustrated in FIG. 10, histograms (1264 and 1265) and time series data (1267 and 1268) of selected feature quantities are displayed.

In this embodiment, in Step S104, while the display device 15 is caused to display the second graph 1252, the control part 11 accepts selection of a first feature quantity from among a plurality of feature quantities calculated from one piece of the first measurement data among a plurality of pieces of measurement data 221 and selection of a second feature quantity from among a plurality of feature quantities calculated from the other piece of measurement data. In selection of each feature quantity, the second graph 1252 may be used. For example, the control part 11 may accept selection of each second node 155 of the second graph 1252 through the input device 14.

Figure 9A:
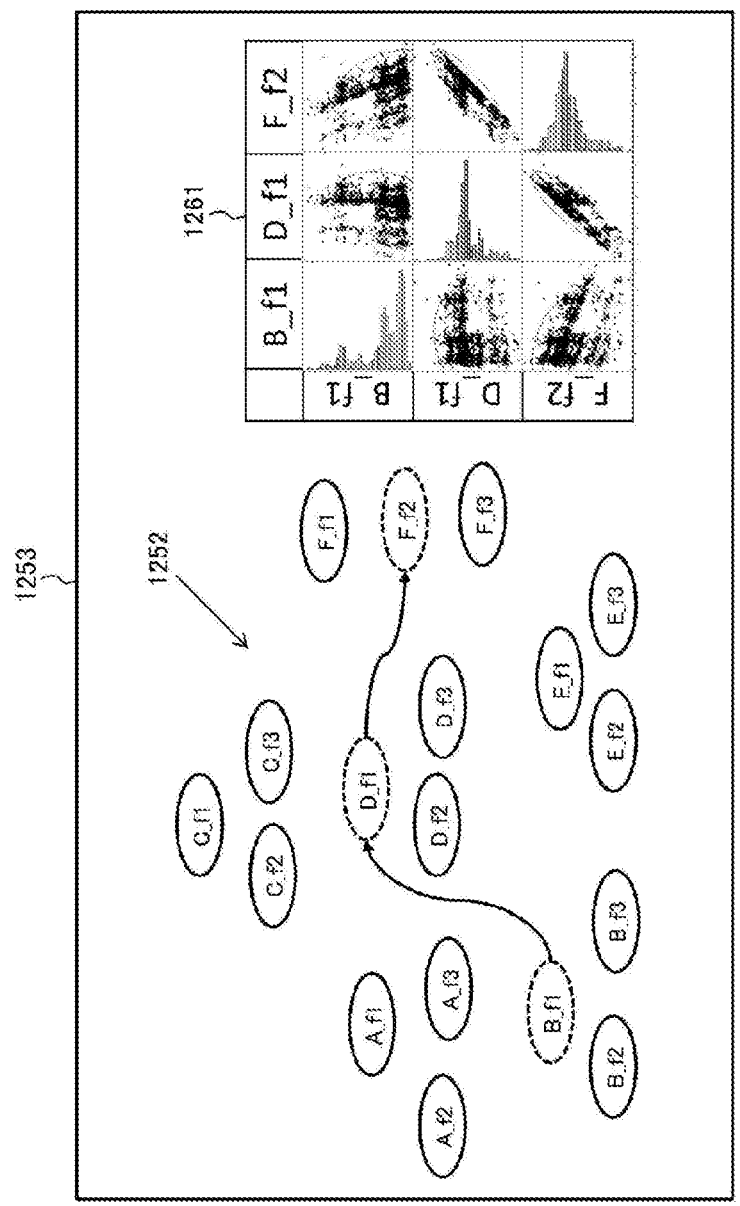
FIG. 9A illustrates an example of a display form of a causal relationship according to the embodiment.
Figure 9B:
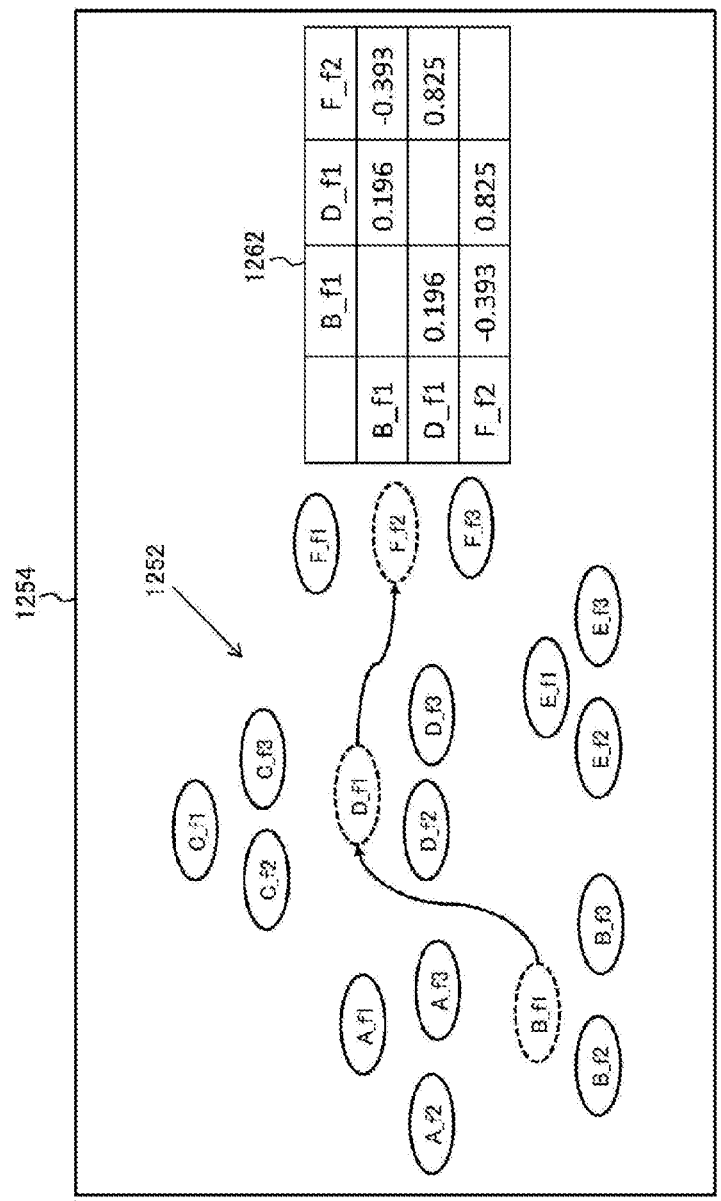
FIG. 9B illustrates an example of a display form of a causal relationship according to the embodiment.
Figure 9C:
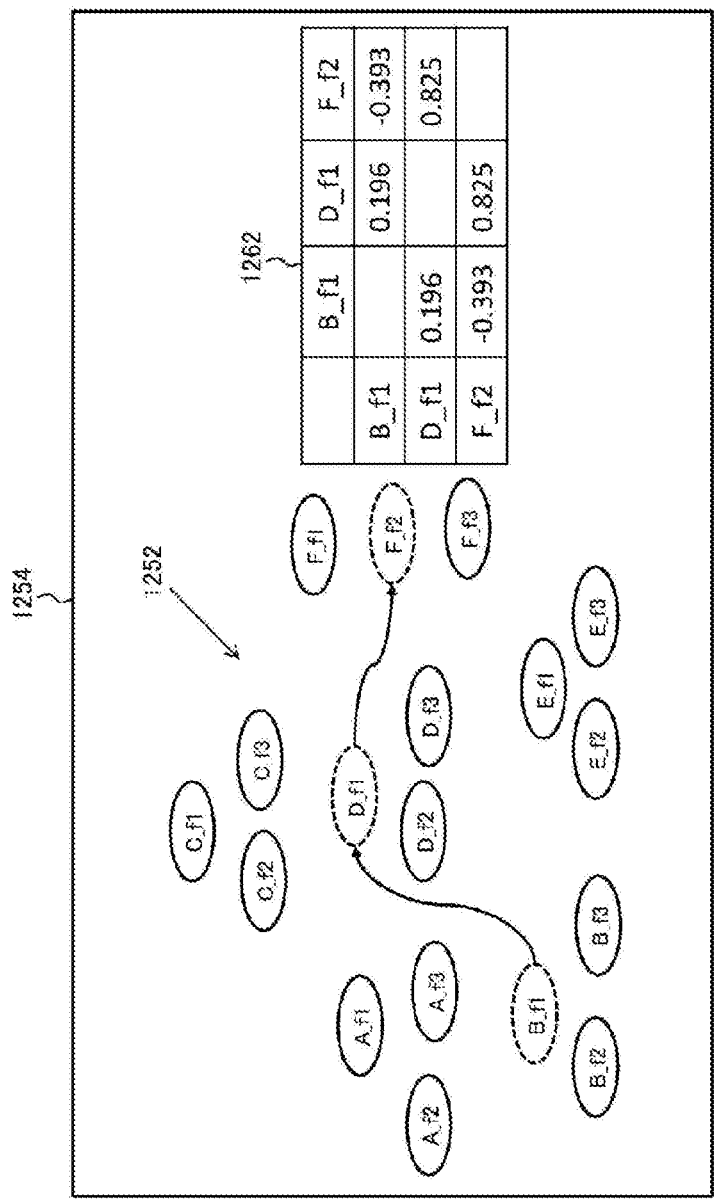
FIG. 9C illustrates an example of a display form of a causal relationship according to the embodiment.

Next, for the screens 1253 to 1255 illustrated in FIGS. 9A to 9C, the control part 11 generates information 1261 to information 1263 relating to the conditional independencies calculated between the first feature quantity and the second feature quantity that have been selected on the basis of calculation results acquired in Steps S202 and S203. Then, the control part 11 causes the display device 15 to further display the generated information 1261 to 1263.

Figure 10:
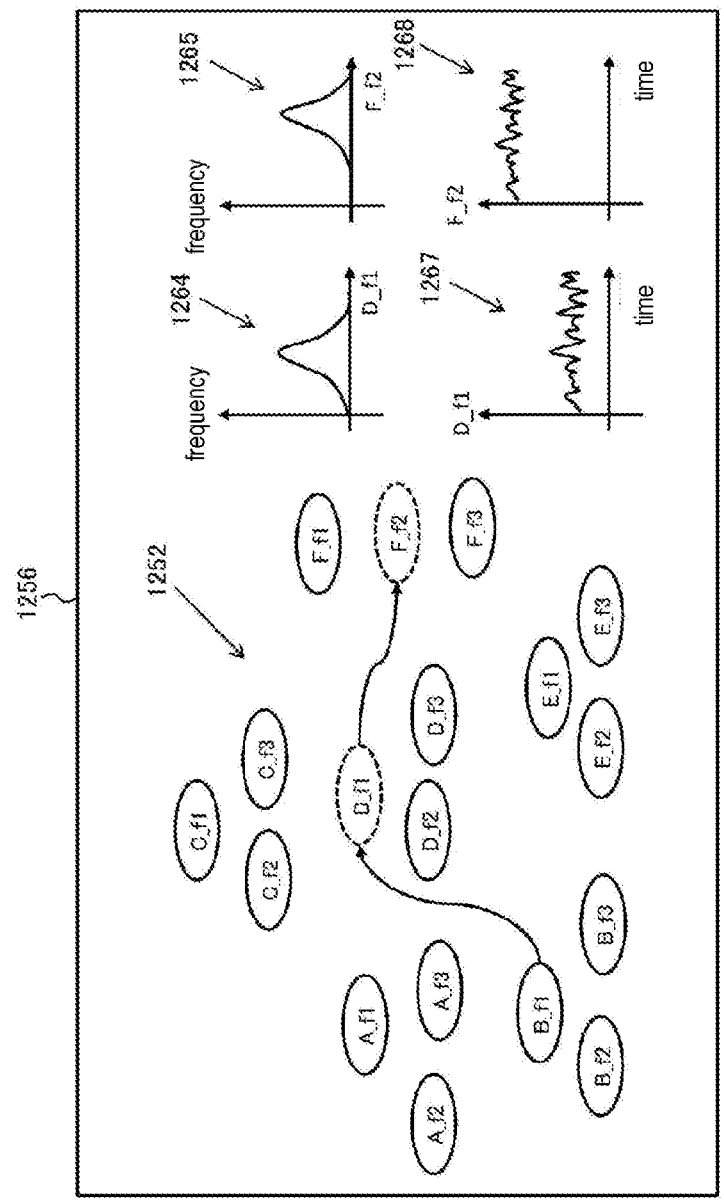
FIG. 10 illustrates an example of a display form of a causal relationship according to the embodiment.

In addition, in the screen 1256 illustrated in FIG. 10, the control part 11 generates histograms (1264 and 1265) and time series data (1267 and 1268) of the selected feature quantities on the basis of calculation results acquired in Step S202. Then, the control part 11 causes the display device 15 to further display the histograms (1264 and 1265) and the time series data (1267 and 1268) that have been generated.

In the example illustrated in FIGS. 9A to 9C, a view in which a feature quantity "B_f1", a feature quantity "D_f1", and a feature quantity "F_f2" (nodes denoted by dotted lines) are selected is assumed. In a relationship between the feature quantity "B_f1" and the feature quantity "D_f1", one feature quantity is one example of a "first feature quantity" according to the present disclosure, and the other feature quantity is one example of a "second feature quantity" according to the present disclosure. Similarly, also in a relationship between the feature quantity "D_f1" and the feature quantity "F_f2", one feature quantity is one example of the "first feature quantity" according to the present disclosure, and the other feature quantity is one example of the "second feature quantity" according to the present disclosure.

The information 1261 displayed on the screen 1253 illustrated in FIG. 9A has a data structure in the form of a table using items corresponding to the mechanisms 21 as rows and rows. The control part 11 stores a graph representing a distribution of the conditional independency acquired in Step S203 in an element corresponding to the set of mechanisms 21 that have been selected. In addition, the control part 11 stores a histogram of the feature quantity calculated from the measurement data 221 for the corresponding mechanism 21 in Step S202 in an element representing the same mechanism 21. In accordance with this, the control part 11 generates information 1261 representing distributions of conditional independencies and histograms of the feature quantity and displays the generated information 1261 near a display area of the second graph 1252.

In the example illustrated in FIG. 9B, a view in which a correlation coefficient is calculated as an example of the conditional independency is assumed. Information 1262 displayed on the screen 1254 has a data structure in the form of a table that is similar to the information 1261. The control part 11 stores a correlation coefficient calculated in Step S203 in an element corresponding to the set of the selected mechanisms 21. In accordance with this, the control part 11 generates information 1262 representing correlation coefficients as conditional independencies and causes the display device 15 to display the generated information 1262 near a display area of the second graph 1252.

In the example illustrated in FIG. 9C, a view in which partial correlation coefficients are calculated as an example of the conditional independencies is assumed. Information 1263 displayed on the screen 1255 has a data structure in the form of a table that is similar to the information 1261. The control part 11 stores a partial correlation coefficient calculated in Step S203 in an element corresponding to the set of the selected mechanisms 21. In accordance with this, the control part 11 generates information 1263 representing partial correlation coefficients as conditional independencies and causes the display device 15 to display the generated information 1263 near a display area of the second graph 1252.

In an example illustrated in FIG. 10, a view in which a feature quantity "D_f1" and a feature quantity "F_f2" (nodes denoted by dotted lines) are selected is assumed. One feature quantity out of the feature quantity "D_f1" and the feature quantity "F_f2" is one example of the "first feature quantity" according to the present disclosure, and the other feature quantity is one example of the "second feature quantity" according to the present disclosure.

The control part 11 generates histograms (1264 and 1265) and graphs of the time series data (1267 and 1268) of the selected feature quantities on the basis of calculation results acquired in Step S202. Then, the control part 11 causes the display device 15 to display the histograms (1264 and 1265) and the graphs of the time series data (1267 and 1268) that have been generated near a display area of the second graph 1252. However, the screen 1256 is not limited to such an example. On the screen 1256, either the histograms (1264 and 1265) or the time series data (1267 and 1268) may be omitted.

On the screens 1253 to 1256, the information 1261 to 1263 and the additional information of the histograms (1264 and 1265) and the time series data (1267 and 1268) are disposed near the display area of the second graph 1252. In this way, by disposing the additional information near the second graph 1252, the additional information can be easily checked together with the causal relationships between the mechanisms 21. However, the arrangement area of the additional information may not be limited to such an example and may be appropriately selected in accordance with an implemented form.

In Step S104, for example, the control part 11 determines a type of additional information to be generated in accordance with a user's instruction input through the input device 14. Then, the control part 11 generates the additional information of the determined type as described above and causes the display device 15 to further display the generated additional information. The control part 11 may cause the display device 15 to individually display a plurality of types of additional information or may cause the display device 15 to display a plurality of types of additional information simultaneously. In accordance with this, a causal relationship 125 between the mechanisms 21 can be output in association with the additional information relating to the selected feature quantities. For this reason, a user can accurately determine whether or not the identified causal relationship 125 is correct using this additional information.

As above, when the output of the causal relationship information representing the identified causal relationship 125 is completed, the control part 11 causes the process to proceed to a next Step S105.

[Step S105]

In Step S105, the control part 11 operates as the revision accepting part 115 and determines whether or not a revision of the causal relationship 125 represented by the output causal relationship information is to be performed.

A method for determining whether or not a revision is performed may not be particularly limited and may be appropriately determined in accordance with an implemented form. For example, the control part 11 may accept designation of necessity/non-necessity of a revision from a user through the input device 14. Then, in accordance with this designation, the control part 11 may determine whether or not a revision of the causal relationship 125 is to be performed.

In a case in which it is determined that a revision of the causal relationship 125 represented by the output causal relationship information is to be performed, the control part 11 causes the process to proceed to a next Step S106. On the other hand, in a case in which it is determined that a revision of the causal relationship 125 represented by the output causal relationship information is not to be performed, the control part 11 ends the process relating to this operation example.

[Step S106]

In Step S106, the control part 11 operates as the revision accepting part 115 and accepts a revision of the causal relationship 125 represented by the output causal relationship information.

In this embodiment, while the causal relationship information is displayed in the display device 15 in one of the forms illustrated in FIGS. 8A to 10, the control part 11 accepts a revision of the identified causal relationship 125. A method for accepting a revision may not be particularly limited and may be appropriately determined in accordance with an implemented form.

For example, on the graphs (1251 and 1252), a revision of the causal relationship to be present corresponds to connecting nodes (151 and 155), which have not been connected using edges (152 and 156), using a new edge (in other words, adding a new edge). Thus, as one example, in a case in which a revision of mechanisms 21, which have been identified not to have a causal relationship, to have a causal relationship is to be performed, the control part 11 may accept designation of nodes (151 and 155) corresponding to the corresponding mechanisms 21 to be revised to have a causal relationship on the graphs (1251 and 1252).

In addition, for example, on the graphs (1251 and 1252), a revision of a causal relationship to be absent corresponds to deleting edges (152 and 156) connecting the nodes (151 and 155). Thus, in a case in which a revision of a causal relationship to be absent between mechanisms 21, which have been identified to have a causal relationship, the control part 11 may accept designations of edges (152 and 156) for the revision of the causal relationship to be absent on the graphs (1251 and 1252).

The control part 11 accepts at least one of instructions for the two types of revision described above. The number of revisions to be accepted may not be particularly limited or may be appropriately selected in accordance with an implemented form. When an instruction for a revision is accepted, the control part 11 causes the process to proceed to a next Step S107.

[Step S107 to Step S109]

In Step S107, the control part 11 revises the causal relationship 125 between the mechanisms 21 in accordance with accepted details (in other words, a revision instruction) of Step S106 and acquires revised causal relationship 127. In Step S108, the control part 11 operates as the premise revising part 116 and revises the premise information 121 such that constraint conditions appropriate for the revised causal relationship 127 are imposed. In accordance with this, the control part 11 acquires the revised premise information 129. In Step S109, the control part 11 stores the revised premise information 129.

Figure 11A:
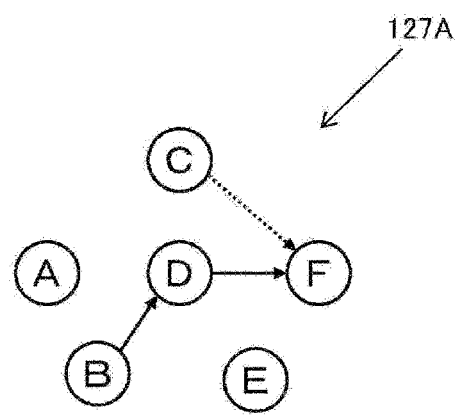
FIG. 11A illustrates an example of a revision of an identified causal relationship.
Figure 11B:
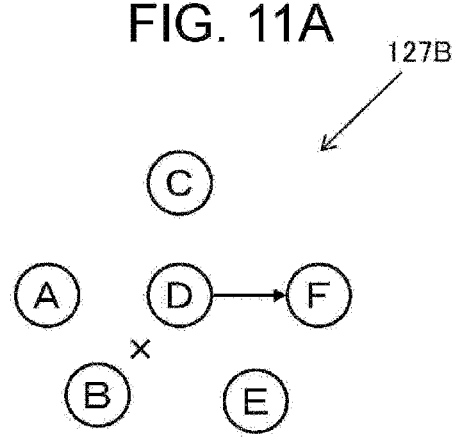
FIG. 11B illustrates an example of a revision of an identified causal relationship.
Figure 12A:
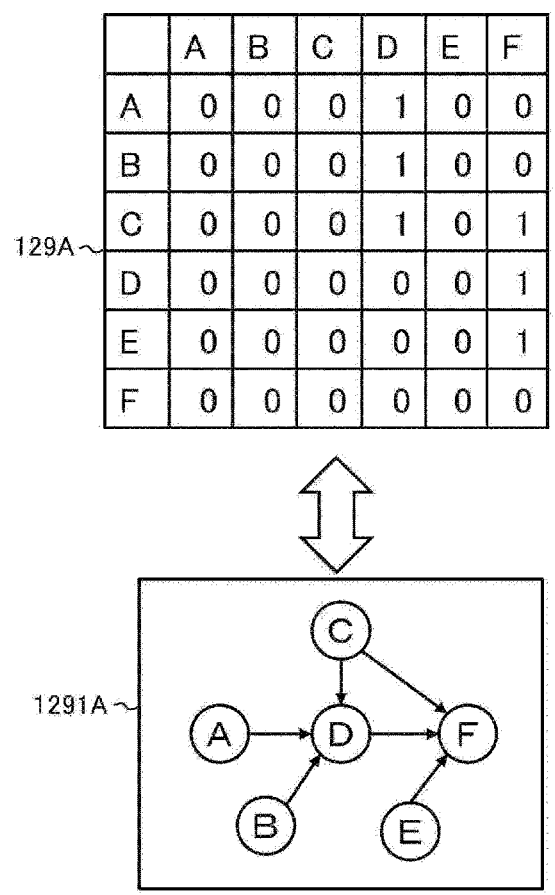
FIG. 12A illustrates an example of revised premise information.
Figure 12B:
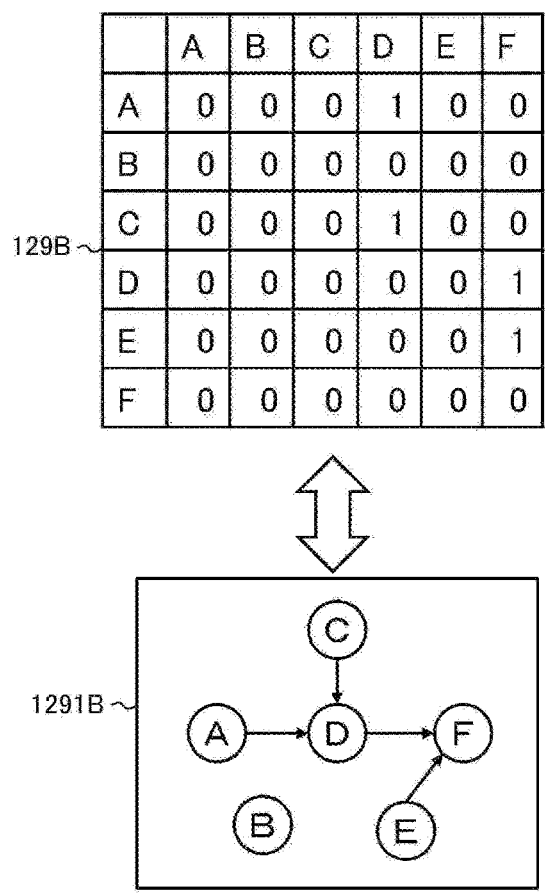
FIG. 12B illustrates an example of revised premise information.

An example of this revision process will be described in detail with reference to FIGS. 11A to 12B. FIG. 11A illustrates an example of a revised causal relationship 127A that is acquired by revising mechanisms 21, which have been identified to have no causal relationship, to have a causal relationship. FIG. 11B illustrates an example of a revised causal relationship 127B that is acquired by revising mechanisms 21, which have been identified to have a causal relationship, to have no causal relationship. FIG. 12A illustrates an example of revised premise information 129A that is acquired in accordance with the revision illustrated in FIG. 11A. FIG. 12B illustrates an example of revised premise information 129B that is acquired in accordance with the revision illustrated in FIG. 11B. Specific revision details illustrated in each drawing are merely examples for the convenience of description and are not for the purpose of limiting the present disclosure and this embodiment.

In Step S106, in a case in which a revision of mechanisms 21, which have been identified to have no causal relationship, to have a causal relationship is accepted, in Step S107, the control part 11 performs a revision of the corresponding mechanisms 21 to have a causal relationship in accordance with the instruction of the revision. In accordance with this, the control part 11 can acquire the revised causal relationship 127A illustrated in FIG. 11A.

In the example illustrated in FIG. 11A, a view in which a revision of a mechanism "C" to have a causal relationship to a mechanism "F" is performed is assumed. In the constraint conditions 123A illustrated in FIG. 6B described above, it is defined that a causal relationship is not formed between the mechanism "C" and the mechanism "F". In this way, in a case in which mechanisms 21 defined to have no causal relationship by the constraint conditions 123 are revised to have a causal relationship, as illustrated in FIG. 12A, the control part 11 revises the premise information 121 such that constraint conditions defining that a causal relationship is formed between the mechanisms 21 is imposed in Step S108.

In the example illustrated in FIG. 12A, the control part 11 revises a value of a corresponding element in the premise information 121 (the adjacency matrix) from "0" to "1" such that the mechanism "C" is represented to have a relationship to the mechanism "F" in accordance with the revision illustrated in FIG. 11A. In accordance with this, the control part 11 can acquire revised premise information 129A. Similar to the graph 1211, a graph 1291A is a directed graph that is derived from the revised premise information 129A. In the graph 1291A, nodes corresponding to the mechanism "C" and the mechanism "F" are connected using a new edge, which represents that the mechanism "C" has been revised to have a relationship to the mechanism "F".

On the other hand, in a case in which a revision of mechanisms 21, which have been identified to have a causal relationship, to have no causal relationship is accepted in Step S106, the control part 11 performs a revision of the corresponding mechanisms 21 to have no causal relationship in accordance with the instruction of the revision in Step S107. In accordance with this, the control part 11 can acquire a revised causal relationship 127B illustrated in FIG. 11B.

In the example illustrated in FIG. 11B, a view in which a revision of a mechanism "B" and a mechanism "D" to have no causal relationship therebetween is assumed. In the constraint conditions (123A and 123B) illustrated in FIGS. 6B and 6C described above, a causal relationship is defined to be formed between the mechanism "B" and the mechanism "D". In this way, in a case in which mechanisms 21 defined to form a causal relationship by the constraint conditions 123 are revised to have no causal relationship, as illustrated in FIG. 12B, the control part 11 revises the premise information 121 such that constraint conditions defining that a causal relationship is not formed between the mechanisms 21 is imposed in Step S108.

In the example illustrated in FIG. 12B, the control part 11 revises a value of the corresponding element in the premise information 121 (the adjacency matrix) from "1" to "0" such that the mechanism "B" is represented to have no relationship to the mechanism "D" in accordance with the revision illustrated in FIG. 11B. In accordance with this, the control part 11 can acquire revised premise information 129B. Similar to the graph 1211, a graph 1291B is a directed graph that is derived from the revised premise information 129B. In the graph 1291B, an edge between nodes corresponding to the mechanism "B" and the mechanism "D" is deleted, which represents that the mechanism "B" has been revised to have no relationship to the mechanism "D".

In accordance with the processes described above, the control part 11 can acquire the revised premise information 129 (129A and 129B). In Step S109, the control part 11 appropriately stores the revised premise information 129. For example, the control part 11 may overwrite the revised premise information 129 onto the premise information 121 in the storage part 12 or may store the revised premise information 129 separately from the premise information 121 in the storage part 12. In addition, a storage destination of the revised premise information 129 may not be limited to such an example and may be appropriately selected in accordance with an implemented form. For example, the control part 11 may store the revised premise information 129 in the storage medium 91, an external storage device, another information processing device, or the like. In accordance with this, the revised premise information 129 is used as new premise information 121. When the storage of the revised premise information 129 is completed, the control part 11 returns the process to Step S104 and repeats the process from Step S104.

[Features]

As above, the analysis device 1 according to this embodiment accepts a revision to the causal relationship information output in accordance with the processes of Steps S105 to S109 and revises the premise information 121 together with the causal relationship information in accordance with the accepted revision details. By repeating this series of revision processes when the causal relationship information is generated, the analysis device 1 according to this embodiment can acquire the premise information 121 in which various states of a site are gradually reflected. For this reason, the analysis device 1 according to this embodiment can generate causal relationship information having a high degree of certainty using the constraint conditions 123 imposed by the premise information 121 thereof. Thus, according to the analysis device 1 of this embodiment, a causal relationship between mechanisms 21 in which actual situations of the production line 2 is reflected can be derived more accurately. As a result, a user can accurately perceive the state of the site more quickly. In addition, by using the constraint conditions 123 imposed by the premise information 121, a range in which presence/absence of a causal relationship between mechanisms 21 is determined can be narrowed down in Step S103. In accordance with this, a calculation cost required for the process of Step S103 is reduced, and a causal relationship between the mechanisms 21 can be derived at a relatively high speed.

4. Modified Example

As above, although the embodiment of the present disclosure has been described in detail, the description presented above is a merely an example of the present disclosure in every point. It is apparent that various alterations and modifications can be made without departing from the scope of the present disclosure. For example, changes as below can be made. Hereinafter, the same reference signs will be used for constituent elements that are similar to those of the embodiment described above, and points that are similar to those of the embodiment described above will be appropriately omitted. The following modified examples can be appropriately combined.

<4.1>

In the embodiment described above, the premise information 121 defines presence/absence of a relationship between the mechanisms 21, and the constraint conditions 123 are identified on the basis of the presence/absence of a relationship between the mechanisms 21 defined using the premise information 121. However, a correspondence relationship between the premise information 121 and the constraint conditions 123 may not be limited to such an example and may be appropriately determined in accordance with an implemented form. For example, the premise information 121 may define the constraint conditions 123. In other words, the premise information 121 may directly represent the constraint conditions 123. In addition, the revising of the premise information 121 in Step S108 described above and the storing of the revised premise information 129 in Step S109 described above may include a revision of the constraint conditions 123 such that the constraint conditions are appropriate for the revised causal relationship 127 and storage of information representing the revised constraint conditions as the premise information 129. The method for revising the constraint conditions 123 may be similar to the method for revising the premise information 121 described above. In addition, each of the premise information 121 and the constraint conditions 123 may be directly revised in accordance with an operator's designation and the like not through a revision to the causal relationship 125.

In addition, in the embodiment described above, a relationship defined by the premise information 121 includes a dependency relationship, in other words, a directivity for which the causal relationship is formed. In accordance with this, the premise information 121 is configured to be able to be represented using a directed graph such as the graph 1211. However, the relationship defined by the premise information 121 is not limited to such an example. The relationship defined by the premise information 121 may not include a directivity for which the causal relationship is formed. In such a case, in the adjacency matrix described above, each of two elements corresponding to a set of the mechanisms 21 mutually having a relationship may be "1". In addition, the relationship between the mechanisms 21 represented by the premise information 121 may be represented using a non-directed graph. This similarly applies also to the constraint conditions 123.

In addition, in the embodiment described above, the level of the constraint conditions 123 is divided in accordance with a difference in the range in which an identified causal relationship is formed from a range defined to have a relationship by the premise information 121. However, the method of identifying the constraint conditions 123 from the premise information 121 may not be limited to such an example. The level division of the constraint conditions 123 may be omitted.

In addition, in the embodiment described above, the premise information 121 may be given for each event. In such a case, the storage part 12 may store a plurality of pieces of premise information 121 corresponding to predetermined events. In Step S102 described above, the control part 11 accepts selection of an event that identifies a causal relationship. A method for accepting selection of an event may not be particularly limited and may be appropriately determined in accordance with an implemented form. For example, the control part 11 may cause the display device 15 to display a list of events and accept selection of an event through the input device 14. In addition, the event may include all kinds of event that may occur in the production line 2 such as an occurrence of a predetermined breakdown, an occurrence of a predetermined defect in a manufactured product, and the like. In accordance with this, when an event is selected, the control part 11 acquires premise information 121 corresponding to the selected event. Then, by executing the process of Step S03 and subsequent processes, the control part 11 identifies a causal relationship 125 between the mechanisms 21 using the premise information 121 acquired in accordance with the selected event. According to this modified example, a causal relationship between the mechanisms 21 in which actual situations of the production line 2 are reflected can be derived more accurately in accordance with the event.

Similarly, the constraint conditions 123 may be given for each event. In such a case, before Step S201 described above, the control part 11 may accept selection of an event that identifies a causal relationship. In Step S202, for example, the control part 11 may determine a method for identifying the constraint conditions 123 from the premise information 121 in accordance with a selected event such as a method for selecting one of the first level and the second level. Then, the control part 11 may identify the constraint conditions 123 from the premise information 121 using the determined method. By executing the process of Step S203 and subsequent processes, the control part 11 can identify a causal relationship 125 between the mechanisms 21 using the constraint conditions 123 identified in accordance with the selected event. According to this modified example, a causal relationship between the mechanisms 21 in which actual situations of the production line 2 are reflected can be derived more accurately in accordance with the event.

In addition, in the embodiment described above, the premise information 121 may be given for each device configuration. In such a case, the storage part 12 may store a plurality of pieces of premise information 121 corresponding to predetermined device configurations. In Step S102 described above, the control part 11 accepts selection of a device configuration that identifies a causal relationship. Similar to the method for accepting selection of a device configuration, the method for accepting selection of a device configuration may not be particularly limited and may be determined in accordance with an implemented form. For example, the control part 11 may cause the display device 15 to display a list of device configurations and may accept selection of the device configuration through the input device 14. In addition, the device configuration may represent a part of the production line 2 or may represent the entire production line 2. A part of the production line 2 may be composed of one or a plurality of devices such as a pressing machine, a packaging machine, or the like or may be composed of a part of a device. A type of device configuration may be defined by all the combinations of the mechanisms 21 composing the production line 2. In accordance with this, when a device configuration is selected, the control part 11 acquires premise information 121 corresponding to the selected device configuration. Then, by executing the process of Step S103 and subsequent processes, the control part 11 identifies a causal relationship 125 between the mechanisms 21 using the premise information 121 acquired in accordance with the selected device configuration. According to this modified example, a causal relationship between the mechanisms 21 in which actual situations of the production line 2 are reflected can be derived more accurately in accordance with the device configuration.

<4.2>

In the embodiment described above, in Step S202, a plurality of feature quantities is calculated from each piece of measurement data 221. However, the number of feature quantities calculated is not limited to such an example but may be arbitrary. In Step S202, the control part 11 may calculate feature quantities from each piece of acquired measurement data 221. In such a case, in Step S203, the control part 11 calculates a conditional independency between the feature quantities calculated. Then, in Step S204, the control part 11 determines presence/absence of a causal relationship between the mechanisms 21 on the basis of the conditional independency between the feature quantities calculated.

<4.3>

In the embodiment described above, in Step S104, the control part 11 outputs the causal relationship information to the display device 15. However, an output destination of the information is not limited to such an example and may be appropriately selected in accordance with an implemented form. For example, the control part 11 may output the causal relationship information to a display device other than the display device 15 or may output the causal relationship information to an output destination other than the display device (for example, a memory or an output device other than the display device).

In addition, in the embodiment described above, the causal relation information includes the adjacency matrix 1250 and the graphs (1251 and 1252). Each of the graphs (1251 and 1252) is a directed graph. However, the data form of the causal relationship information may not be limited to such an example and may be appropriately selected in accordance with an implemented form. The identified causal relationship 125, for example, may be represented in a form of characters, symbols, or the like other than a graph. Each of the graphs (1251 and 1252) may be a non-directed graph.

In addition, in the embodiment described above, the control part 11 outputs each of the graphs (1251 and 1252) of each form through switching. However, the display form of the causal relationship information may not be limited to such an example. The switching of the display form may be omitted. In such a case, any one of the first form and the second form may be employed as the display form of the causal relationship information, and the other form may be omitted.

In addition, in the embodiment described above, various kinds of information such as the graphs (1251 and 1252), the information 1261 to 1263, the histograms (1264 and 1265), and the time series data (1267 and 1268) are output to a common output destination (the display device 15). However, an output destination of at least some of the various kinds of information may be different from the output destinations of the others. In addition, additional information of the information 1261 to 1263, the histograms (1264 and 1265), and the time series data (1267 and 1268) may be output separately from the graphs (1251 and 1252).

In addition, in the embodiment described above, while the display device 15 is caused to display the second graph 1252, selection of feature quantities for generating additional information is accepted. However, a method for accepting selection of feature quantities may not be limited to such an example and may be appropriately determined in accordance with an implemented form. The control part 11 may accept selection of feature quantities separately from the display of the second graph 1252.

<4.4>

In the embodiment described above, in Step S106, while the display device 15 is caused to display the causal relationship information in one form, the control part 11 accepts a revision to the identified causal relationship 125. However, a form in which a revision is accepted may not be limited to such an example. The control part 11 may accept a revision to the identified causal relationship 125 separately from the display of the causal relationship information. In addition, the control part 11 may accept a revision to the identified causal relationship 125 using a method other than a graph operation.

<4.5>

In the embodiment described above, each piece of measurement data 221 may include normal data acquired when the operation of the production line 2 is normally performed and abnormal data acquired when an abnormality occurs in the operation of the production line 2. A view in which "an abnormality has occurred", for example, is a view in which a predetermined breakdown has occurred, a view in which a predetermined defect has occurred in a manufactured product. In such a case, in Step S104, the control part 11 may output at least one of histograms and time series data of each of feature quantities calculated from the normal data and the abnormal data.

Figure 13:
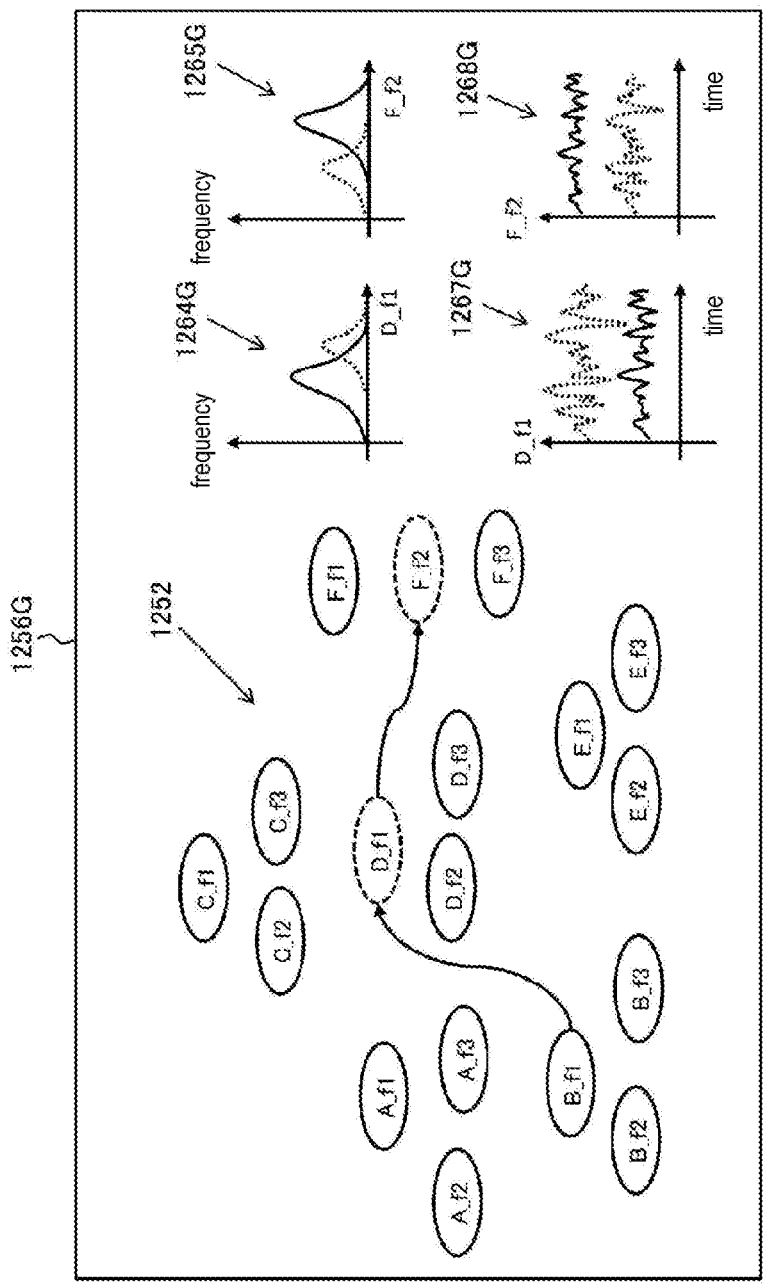
FIG. 13 illustrates an example of a display form of a causal relationship according to a modified example.

FIG. 13 schematically illustrates an example of a screen 1256G displayed in the display device 15 according to this modified example. In the example illustrated in FIG. 13, similar to the example illustrated in FIG. 10, a view in which a feature quantity "D_f1" and a feature quantity "F_f2" (nodes denoted by dotted lines) are selected is assumed. One feature quantity out of the feature quantity "D_f1" and the feature quantity "F_f2" is one example of "first feature quantity", and the other feature quantity is one example of "second feature quantity".

In this modified example, in Step S04, the control part 11 generates histograms (1264G and 1265G) of the selected feature quantities and graphs of the time series data (1267G and 1268G) from normal data and abnormal data included in the measurement data 221 on the basis of calculation results acquired in Step S202. Then, the control part 11 causes the display device 15 to display the histograms (1264G and 1265G) and the graphs of the time series data (1267G and 1268G) that have been generated near the display area of the second graph 1252.

In accordance with this, according to this modified example, the causal relationship 125 between the mechanisms 21 can be output in association with the histograms (1264G and 1265G) and the time series data (1267O and 1268G) acquired from the normal data and the abnormal data. For this reason, a user can accurately determine whether or not the identified causal relationship 125 is correct while comparing data at a normal time and data at an abnormal time.

In addition, the screen 1256G may not be limited to such an example. Either the histograms (1264G and 1265G) or the time series data (1267G and 1268G) may be omitted. In addition, in the example illustrated in FIG. 13, the control part 11 causes the display device 15 to display the graph generated from the normal data (denoted by a solid line) and a graph generated from the abnormal data (denoted by a dotted line) in an overlapping manner. However, the display forms of the graphs are not limited to such an example. Furthermore, the arrangement areas of the histograms (12640 and 1265G) and the time series data (1267G and 1268G) may not be limited to those of the example illustrated in FIG. 13 and may be appropriately selected in accordance with an implemented form.

The invention claimed is:

1. An analysis device comprising:
a processor, configured to:
acquire a plurality of pieces of measurement data relating to states of a plurality of mechanisms composing a production line;
acquire premise information for imposing constraint conditions defining whether or not a causal relationship has been funned between the mechanisms;
identify a causal relationship between the plurality of mechanisms by statistically analyzing the plurality of pieces of acquired measurement data under the constraint conditions imposed by the premise information,
wherein the premise information defines presence/absence of a relationship between the mechanisms, and
wherein the constraint conditions are identified on the basis of the presence/absence of the relationship between the mechanisms defined by the premise information;
output causal relationship information representing the identified causal relationship;
accept a revision to the causal relationship represented by the output causal relationship information; and
revise the premise information such that constraint conditions appropriate for the revised causal relationship are imposed; and
a memory configured to store the revised premise information.

2. The analysis device according to claim 1, wherein the statistically analyzing of the plurality of pieces of measurement data includes calculation of a plurality of feature quantities from each of the plurality of pieces of the acquired measurement data, calculation of a conditional independency between each of the feature quantities calculated from one piece of measurement data among the plurality of pieces of measurement data and each of the feature quantities calculated from another piece of the measurement data, and determination of the presence/absence of the causal relationship between the mechanisms on the basis of the calculated conditional independencies.

3. The analysis device according to claim 2, wherein outputting of the causal relationship information includes outputting of the causal relationship information through switching between a first form in which the identified causal relationship is represented using the mechanisms as items and a second foam in which the identified causal relationship is represented using the feature quantities as items.

4. The analysis device according to claim 2, wherein outputting of the causal relationship information includes acceptance of selection of a first feature quantity from among the plurality of feature quantities calculated from the one piece of measurement data, acceptance of selection of a second feature quantity from among the plurality of feature quantities calculated from the other piece of the measurement data, and outputting of the conditional independency calculated between the first feature quantity and the second feature quantity that are selected.

5. The analysis device according to claim 2, wherein outputting of the causal relationship information includes acceptance of selection of a first feature quantity from among the plurality of feature quantities calculated from the one piece of measurement data, acceptance of selection of a second feature quantity from among the plurality of feature quantities calculated from the other piece of the measurement data, and outputting of at least one of a histogram or time series data of each of the first feature quantity and the second feature quantity that are selected.

6. The analysis device according to claim 1, wherein the processor identifies the constraint conditions by performing switching between a first level defining that the causal relationship is formed only between the mechanisms defined to directly have a relationship by the premise information and a second level defining that the causal relationship is further formed also between the mechanisms defined to indirectly have a relationship by the premise information.

7. The analysis device according to claim 1,
wherein the premise information is given for each event, and
wherein the acquisition of the premise information includes selection of an event for identifying the causal relationship and acquisition of the premise information according to the selected event.

8. The analysis device according to claim 1,
wherein the premise information is given for each device configuration, and
wherein the acquisition of the premise information includes selection of a device configuration for identifying the causal relationship and acquisition of the premise information according to the selected device configuration.

9. The analysis device according to claim 1, wherein the statistically analyzing of the plurality of pieces of measurement data includes calculation of feature quantities from each of the pieces of the acquired measurement data, calculation of a conditional independency between the feature quantities calculated, and determination of the presence/absence of the causal relationship between the mechanisms on the basis of the calculated conditional independencies between the feature quantities.

10. The analysis device according to claim 1, wherein outputting of the causal relationship information includes generation of a graph representing the identified causal relationship and outputting of the generated graph.

11. The analysis device according to claim 1, wherein the revising of the premise information includes, in a case in which mechanisms defined not to form a causal relationship by the constraint conditions are revised to have a causal relationship, revising the premise information such that constraint conditions defining that a causal relationship is formed between the mechanisms are imposed, and, in a case in which mechanisms defined to form a causal relationship by the constraint conditions are revised to have no causal relationship, revising the premise information such that constraint conditions defining that a causal relationship is not formed between the mechanisms are imposed.

12. An analysis method using a computer, the analysis method comprising:
acquiring a plurality of pieces of measurement data relating to states of a plurality of mechanisms composing a production line;
acquiring premise information for imposing constraint conditions defining whether or not a causal relationship is formed between the mechanisms;
identifying a causal relationship between the plurality of mechanisms by statistically analyzing the plurality of pieces of acquired measurement data under the constraint conditions imposed by the premise information, wherein the premise information defines presence/absence of a relationship between the mechanisms, and wherein the constraint conditions are identified on the basis of the presence/absence of the relationship between the mechanisms defined by the premise information;
outputting causal relationship information representing the identified causal relationship;
accepting a revision to the causal relationship represented by the output causal relationship information;
revising the premise information such that constraint conditions appropriate for the revised causal relationship are imposed; and
storing the revised premise information.

13. A non-transitory computer readable storage medium storing analysis program causing to computer to execute:
acquiring a plurality of pieces of measurement data relating to states of a plurality of mechanisms composing a production line;
acquiring premise information for imposing constraint conditions defining whether or not a causal relationship is formed between the mechanisms;
identifying a causal relationship between the plurality of mechanisms by statistically analyzing the plurality of pieces of acquired measurement data under the constraint conditions imposed by the premise information, wherein the premise information defines presence/absence of a relationship between the mechanisms, and wherein the constraint conditions are identified on the basis of the presence/absence of the relationship between the mechanisms defined by the premise information;
outputting causal relationship information representing the identified causal relationship;
accepting a revision to the causal relationship represented by the output causal relationship information;
revising the premise information such that constraint conditions appropriate for the revised causal relationship are imposed; and
storing the revised premise information.

\* \* \* \* \*